(12) United States Patent
Nakamura et al.

(10) Patent No.: US 9,507,208 B2
(45) Date of Patent: Nov. 29, 2016

(54) LIQUID CRYSTAL DISPLAY AND METHOD OF MANUFACTURING LIQUID CRYSTAL DISPLAY

(71) Applicant: Sony Corporation, Tokyo (JP)

(72) Inventors: Masahiko Nakamura, Kanagawa (JP); Shunichi Suwa, Kanagawa (JP); Masashi Miyakawa, Kanagawa (JP); Yuichi Inoue, Kanagawa (JP); Tadaaki Isozaki, Kanagawa (JP); Yoji Nagase, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/671,404

(22) Filed: Mar. 27, 2015

(65) Prior Publication Data

US 2015/0198836 A1    Jul. 16, 2015

Related U.S. Application Data

(62) Division of application No. 13/075,539, filed on Mar. 30, 2011, now Pat. No. 9,146,422.

(30) Foreign Application Priority Data

Apr. 6, 2010 (JP) .................................. 2010-087658
Feb. 24, 2011 (JP) .................................. 2011-038640

(51) Int. Cl.
| | |
|---|---|
| *G02F 1/1337* | (2006.01) |
| *G02F 1/1333* | (2006.01) |
| *G02F 1/1339* | (2006.01) |
| *G02F 1/1343* | (2006.01) |

(52) U.S. Cl.
CPC ....... *G02F 1/133707* (2013.01); *G02F 1/1339* (2013.01); *G02F 1/13439* (2013.01);
(Continued)

(58) Field of Classification Search
CPC .................. G02F 1/133707; G02F 1/133371; G02F 1/133788; G02F 1/1339; G02F 1/13439; G02F 2001/133357
See application file for complete search history.

(56) References Cited

U.S. PATENT DOCUMENTS

| | | |
|---|---|---|
| 6,897,927 B2 | 5/2005 | Tanaka et al. |
| 2004/0119923 A1 | 6/2004 | Lee et al. |

(Continued)

FOREIGN PATENT DOCUMENTS

| | | |
|---|---|---|
| CN | 1403859 | 3/2003 |
| CN | 1637563 | 7/2005 |

(Continued)

OTHER PUBLICATIONS

Japanese Office Action corresponding to Japanese Serial No. 2011-038640 dated Apr. 21, 2015.

(Continued)

*Primary Examiner* — Nathanael R Briggs
(74) *Attorney, Agent, or Firm* — Dentons US LLP

(57) ABSTRACT

A liquid crystal display capable of realizing a high transmittance while maintaining favorable voltage response characteristics, and a method of manufacturing the same. The liquid crystal display includes: a liquid crystal layer; a first substrate and a second substrate arranged to face each other with the liquid crystal layer in between; a plurality of pixel electrodes provided on a liquid crystal layer side of the first substrate; and an opposite electrode provided on the second substrate to face the plurality of pixel electrodes. One or both of a face on the liquid crystal layer side of the pixel electrode, and a face on the liquid crystal layer side of the opposite electrode includes a concavo-convex structure.

5 Claims, 37 Drawing Sheets

(52) U.S. Cl.
CPC ... *G02F1/133371* (2013.01); *G02F 1/133788* (2013.01); *G02F 1/134309* (2013.01); *G02F 2001/133357* (2013.01)

(56) References Cited

U.S. PATENT DOCUMENTS

| | | | |
|---|---|---|---|
| 2005/0146658 A1* | 7/2005 | Kim .................. | G02F 1/133555 349/114 |
| 2005/0270462 A1 | 12/2005 | Koma | |
| 2006/0268198 A1 | 11/2006 | Utsumi et al. | |
| 2007/0165172 A1 | 7/2007 | Takatori et al. | |
| 2009/0147162 A1 | 6/2009 | Yeom | |
| 2009/0296035 A1 | 12/2009 | Hsiang et al. | |
| 2010/0007833 A1* | 1/2010 | Kuo .................. | G02F 1/133707 349/129 |
| 2010/0066963 A1 | 3/2010 | Hwang et al. | |

FOREIGN PATENT DOCUMENTS

| | | |
|---|---|---|
| CN | 1877419 | 12/2006 |
| JP | 05-232473 | 9/1993 |
| JP | 07-333612 | 12/1995 |
| JP | HEI-07-333634 | 12/1995 |
| JP | 2001-235750 | 8/2001 |
| JP | 2002-357830 | 12/2002 |
| JP | 2003-066455 | 3/2003 |
| JP | 2003-075839 | 3/2003 |
| JP | 2003-149647 | 5/2003 |
| JP | 2003-177418 | 6/2003 |
| JP | 2003-241222 | 8/2003 |
| JP | 2004-302260 | 10/2004 |
| JP | 2005-316330 | 11/2005 |
| JP | 2008-077108 | 4/2008 |

OTHER PUBLICATIONS

Chinese Office Examination Report issued in connections with related Chinese Patent Application No. CN 201110085988.2 dated Dec. 8, 2014.

Japanese Office Action dated Sep. 24, 2014, issued in connection with counterpart Japanese Patent Application No. 2011-038640.

* cited by examiner

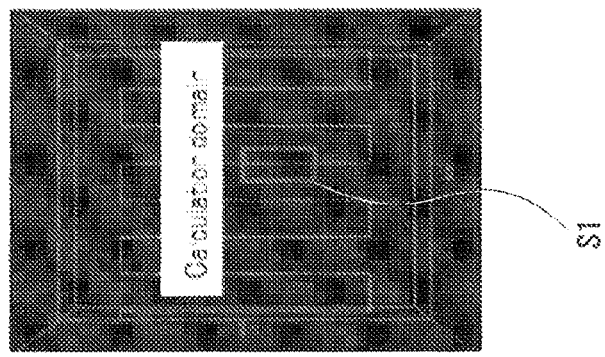
FIG. 33A
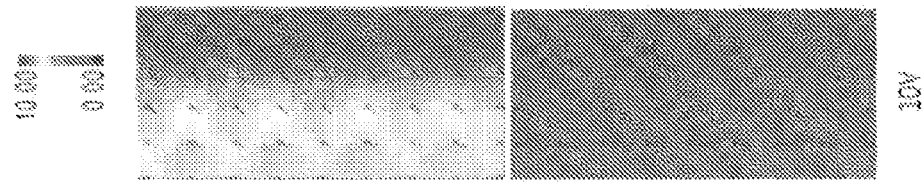
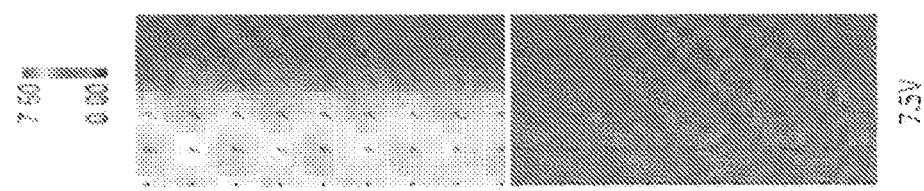
FIG. 33B FINE-SLIT STRUCTURE
FIG. 33C CONCAVO-CONVEX STRUCTURE

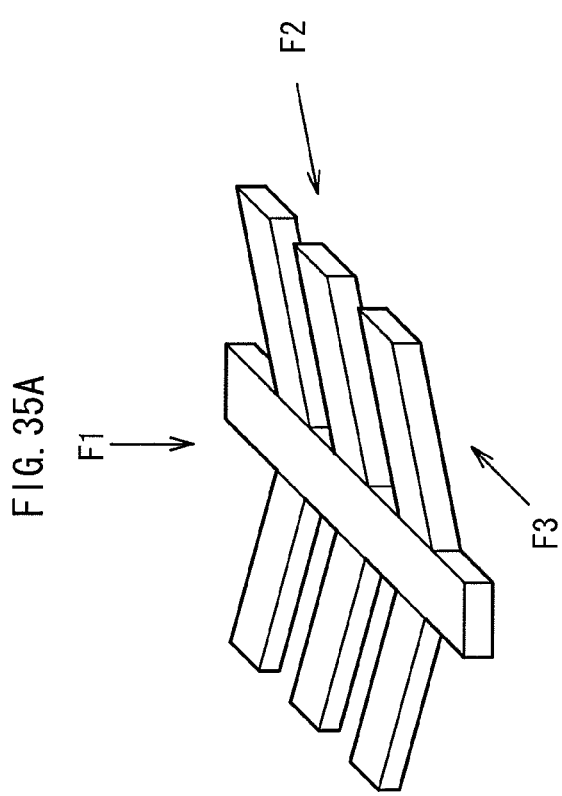
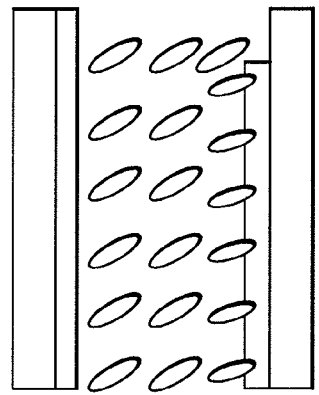
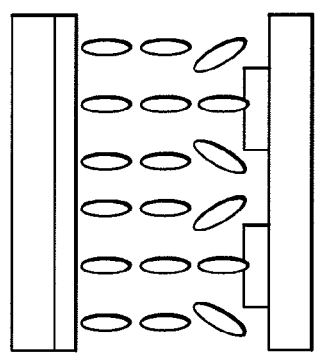
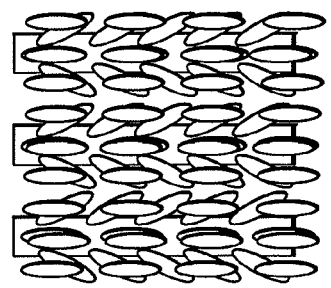

LIQUID CRYSTAL DISPLAY AND METHOD OF MANUFACTURING LIQUID CRYSTAL DISPLAY

RELATED APPLICATION DATA

This application is a division of U.S. patent application Ser. No. 13/075,539 filed Mar. 30, 2011, the entirety of which is incorporated herein by reference to the extent permitted by law. The present application claims the benefit of priority to Japanese Patent Application Nos. JP 2010-087658 filed on Apr. 6, 2010 and Japanese Patent Application No. JP 2011-038640 filed on Feb. 24, 2011 in the Japan Patent Office, the entireties of which are incorporated by reference herein to the extent permitted by law.

BACKGROUND OF THE INVENTION

1. Field of the Invention

The present invention relates to a liquid crystal display using, for example, liquid crystal of a VA mode, and a method of manufacturing the same.

2. Description of the Related Art

In recent years, for example, a VA (vertical alignment) mode is used in liquid crystal display (LCD) devices. In the liquid crystal displays, a liquid crystal layer having the refractive index anisotropy is sealed between a substrate including a pixel electrode and a substrate including an opposite electrode, and a voltage is applied to the liquid crystal layer to change an axis of the refractive index anisotropy, thereby controlling the transmittance of light passing through the liquid crystal layer. In this manner, the liquid crystal display is a display device utilizing electrical stimulation for optical switching.

The liquid crystal display of the VA mode has such characteristics that the liquid crystal layer has the negative dielectric anisotropy, that is, in a liquid crystal molecule, the dielectric constant in a long axis direction is smaller than that in a short axis direction. Thereby, in the liquid crystal layer, the long axis direction of the liquid crystal molecule is aligned along the direction substantially vertical to a substrate surface when no voltage is applied thereto (an off state), and the liquid crystal molecule is aligned to tilt (incline) according to the magnitude of the voltage when the voltage is applied thereto (an on state).

However, when the voltage is applied to the liquid crystal layer in the no-voltage application state, the liquid crystal molecule aligned substantially vertical to the substrate surface tilts, but the tilting direction is arbitrary. Thus, the alignment of the liquid crystal molecules is disordered, and such adverse effects are generated that the response to the voltage is delayed, it is difficult to obtain a desired transmittance, or the like.

Thus, various proposals have been made so far as methods of controlling the alignment of the liquid crystal molecules when the liquid crystal molecules respond to the voltage. For example, an MVA (multi-domain vertical alignment) method, a PVA (patterned vertical alignment) method, or a method using an optical alignment film (for example, see Japanese Unexamined Patent Publication No. Hei-5-232473) has been proposed. In the PVA method, by using a slit and rib (projection), a high viewing angle is realized while the alignment is controlled. Recently, in addition to these methods, a structure in which a plurality of fine slits are provided in a pixel electrode, and an opposite electrode is formed as a solid electrode without slits (a so-called fine slit structure) has been proposed (for example, see Japanese Unexamined Patent Publication No. 2002-357830).

SUMMARY OF THE INVENTION

However, in the above-described methods, it is possible to improve the voltage response characteristics, but the voltage is not applied to a portion corresponding to the slit in the liquid crystal layer (immediately above the slit), and it is difficult to align the liquid crystal molecules (unlikely to tilt). Therefore, dark lines (a portion where the amount of light transmission is locally small) are generated corresponding to the position of the slit, and there is an issue that it is difficult to obtain the high transmittance.

In view of the foregoing, it is desirable to provide a liquid crystal display capable of realizing a high transmittance while maintaining favorable voltage response characteristics, and a method of manufacturing the same.

According to an embodiment of the present invention, there is provided a liquid crystal display including: a liquid crystal layer; a first substrate and a second substrate arranged to face each other with the liquid crystal layer in between; a plurality of pixel electrodes provided on a liquid crystal layer side of the first substrate; and an opposite electrode provided on the second substrate to face the plurality of pixel electrodes. One or both of a face on the liquid crystal layer side of the pixel electrode, and a face on the liquid crystal layer side of the opposite electrode includes a concavo-convex structure.

According to an embodiment of the present invention, there is provided a method of manufacturing a liquid crystal display including the steps of: forming a plurality of pixel electrodes on a first substrate; forming an opposite electrode on a second substrate; sealing a liquid crystal layer by the pixel electrode and the opposite electrode facing each other between the first substrate and the second substrate; and providing a pre-tilt to the liquid crystal layer by exposing the liquid crystal layer while applying a voltage onto the liquid crystal layer through the pixel electrode and the opposite electrode. A concavo-convex structure is formed on one or both of a face on a liquid crystal layer side of the pixel electrode, and a face on the liquid crystal layer side of the opposite electrode.

In the liquid crystal display and the method of manufacturing the liquid crystal display according to the embodiments of the present invention, the concavo-convex structure is provided on one or both of the face on the liquid crystal layer side of the pixel electrode, and the face on the liquid crystal layer side of the opposite electrode. Thus, in the liquid crystal layer when a voltage is applied thereto, distortion of an electric field (lateral electric field) is generated due to height difference (step) between a concave face and a convex face in the concavo-convex structure. Meanwhile, there is no notched portion in the electrode, such as a slit, so a region to which the voltage is not applied in the liquid crystal layer is eliminated, and alignment of liquid crystal molecules is suppressed from being insufficient in a local region.

According to the liquid crystal display and the method of manufacturing the liquid crystal display of the embodiments of the present invention, the concavo-convex structure is provided on one or both of the face on the liquid crystal layer side of the pixel electrode, and the face on the liquid crystal layer side of the opposite electrode. Thus, when the voltage is applied to the liquid crystal layer, the distortion of the electric field is generated in the liquid crystal layer, and it is thereby possible to efficiently provide a pre-tilt. Meanwhile, because the alignment of the liquid crystal molecules may be suppressed from being insufficient in the local region, the result is that reduction of transmittance may be suppressed. Therefore, it is possible to realize high transmittance while favorable voltage response characteristics are maintained.

Other and further objects, features and advantages of the invention will appear more fully from the following description.

BRIEF DESCRIPTION OF THE DRABLADE SECTIONS

FIGS. 33A to 33C are simulation results illustrating the inclination of the liquid crystal molecules when the liquid crystal molecules respond to the voltage.

FIGS. 35A to 35D are schematic views for explaining the alignment state in the case of the fine-slit structure.

DETAILED DESCRIPTION OF THE PREFERRED EMBODIMENT

An embodiment of the present invention will be hereinafter described in detail with reference to the drawings. In addition, description will be given in the following order.

1. Embodiment (example in which a concavo-convex structure is provided on a surface of a pixel electrode, and a rear surface is flat)

2. Modification 1 (example in which the concavo-convex structure is provided on a foundation layer (a planarizing film) of the pixel electrode)
3. Modification 2 (example in which the concavo-convex structure of the pixel electrode is formed in a two-step process)
4. Modification 3 (example in which the concavo-convex structure of the pixel electrode has a taper)
5. Modification 4 (example in which the concavo-convex structure of the pixel electrode has a reverse taper)
6. Modifications 5-1 to 5-5 (detailed structure example of the case in which the concavo-convex structure is provided in the foundation layer of the pixel electrode)
7. Modification 6 (structure example of an end portion of the pixel electrode)
8. Examples
   First example (measurement results of the transmittance in the case where a height of step of the concavo-convex structure is varied)
   Second example (measurement results of the transmittance in the case where a width of a top face is varied in Modification 3)
   Third example (measurement results of the transmittance in the case where the height of the step is varied in Modification 3)
1. Embodiment Configuration of a liquid crystal display 1

Figure 1:
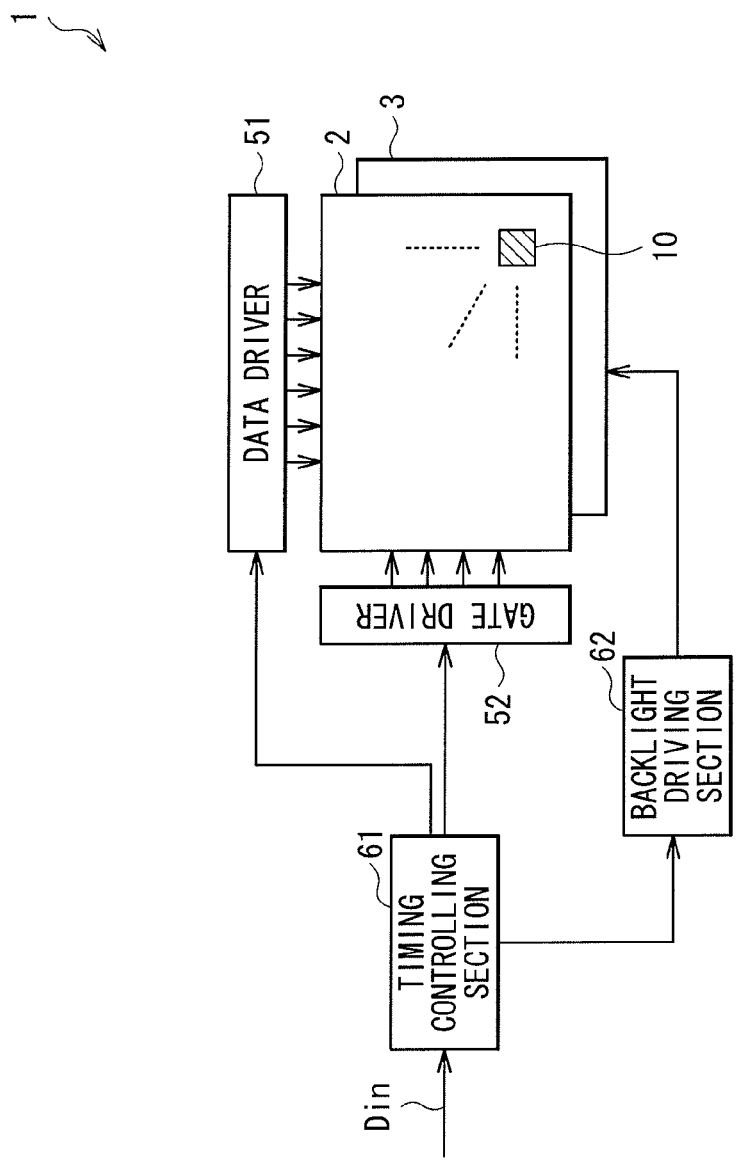
FIG. 1 is a block diagram illustrating the overall configuration of a liquid crystal display according to an embodiment of the present invention.

FIG. 1 illustrates the overall configuration of a liquid crystal display (a liquid crystal display 1) according to an embodiment of the present invention. The liquid crystal display 1 includes, for example, a liquid crystal display panel 2, a backlight 3, a data driver 51, a gate driver 52, a timing controlling section 61, and a backlight driving section 62, and displays a picture based on an external input signal Din.

The backlight 3 is a light source irradiating light to the liquid crystal display panel 2, and is disposed on the back side of the liquid crystal display panel 2 (on a face on a side of a polarizing plate 19 which will be described later). The backlight 3 includes, for example, an LED (light emitting diode), a CCFL (cold cathode fluorescent lamp), or the like. The backlight driving section 62 controls lighting operation (light emitting operation) of the backlight 3.

The timing controlling section 61 controls the drive timing of the gate driver 52, the data driver 51, and the backlight driving section 62, and supplies a picture signal based on the external input signal Din to the data driver 51.

The gate driver 52 drives each pixel 10 in the liquid crystal display panel 2 in accordance with timing control by the timing controlling section 61. The data driver 51 performs a D/A conversion on the picture signal (the picture signal based on the external input signal Din) supplied from the timing controlling section 61, and outputs the picture signal, which has been subjected to the D/A conversion, to each pixel 10 of the liquid crystal display panel 2.

The liquid crystal display panel 2 modulates light emitted from the backlight 3 based on the drive signal supplied from the gate driver 52, and the picture signal supplied from the data driver 51. The liquid crystal display panel 2 includes the plurality of pixels 10 disposed in matrix as a whole.

Figure 2:
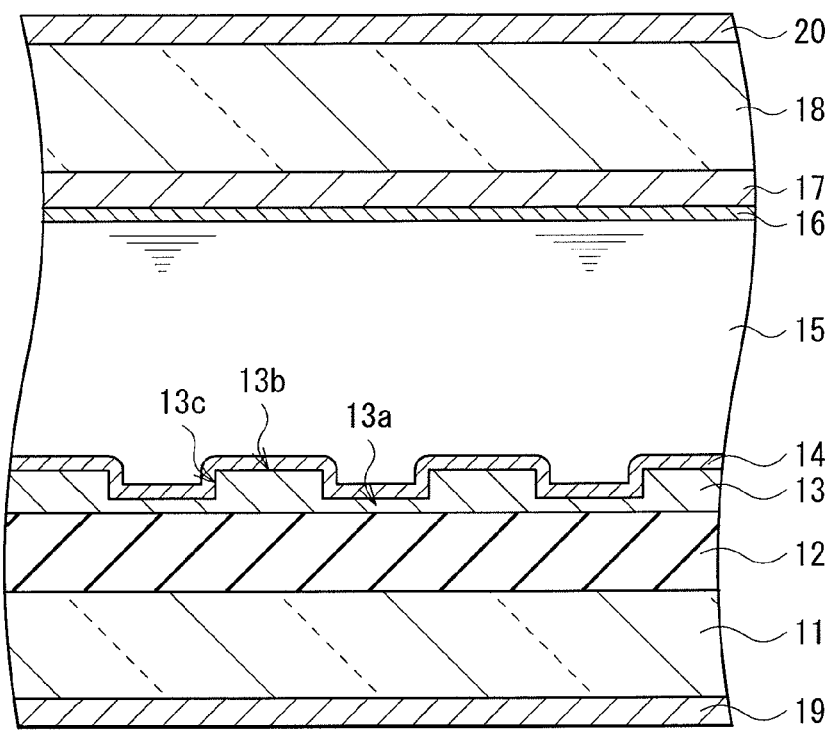
FIG. 2 is a cross-sectional view illustrating a partial region of a pixel illustrated in FIG. 1.

FIG. 2 illustrates the cross-sectional structure of the liquid crystal display panel 2. However, FIG. 2 illustrates only a partial region of the pixel 10. In the liquid crystal display panel 2, a liquid crystal layer 15 is sandwiched between a drive substrate 11 and a facing substrate 18, and the polarizing plate 19 and a polarizing plate 20 are bonded onto outer faces of the drive substrate 11 and the facing substrate 18, respectively. A planarizing film 12 is formed on the drive substrate 11 so as to cover the surface of the drive substrate 11. A pixel electrode 13 is disposed for each pixel 10 on the planarizing film 12, and an alignment film 14 is formed to cover the surface of the pixel electrode 13. On a face on the liquid crystal layer 15 side of the facing substrate 18, an opposite electrode 17 is disposed over the whole surface of an effective display area, and an alignment film 16 is formed to cover the surface of the opposite electrode 17.

In the drive substrate 11, a drive circuit driving the pixel 10, for example, the gate driver 52, the data driver 51, the timing controlling section 61, the backlight driving section 62, and the like described above are disposed on a glass substrate. Above the drive substrate 11, wirings such as a gate line and a source line to which each drive signal from the gate driver 52 and the data driver 51 is transmitted, a TFT (thin film transistor) (both of them are not illustrated in the figure), and the like are connected to each pixel electrode 13.

The planarizing film 12 is an overcoat film planarizing the surface of the drive substrate 11 above which the drive circuit, the wirings, and the like described above are disposed. The planarizing film 12 is an insulating film formed of an organic film of a thermoset resin or a photoreactive resin, and has, for example, a thickness of 1 μm to 10 μm both inclusive. Instead of the planarizing film 12 formed of the organic film, for example, an inorganic insulating film such as a silicon oxide film ($SiO_2$), a silicon nitride film (SiN), or a silicon oxide nitride film (SiON) may be provided.

(Structure of Pixel Electrode)

The pixel electrode 13 is, for example, formed of a transparent conductive film of ITO (indium tin oxide), IZO, or the like and has a concavo-convex structure on its surface (surface on the liquid crystal layer 15 side). In this embodiment, the concavo-convex structure includes a concave face 13a and a convex face 13b alternately aligned along the direction parallel to a substrate surface, and a step portion between the concave face 13a and the convex face 13b is a vertical face 13c vertical to the substrate surface. In addition, in the pixel electrode 13, only the face on the liquid crystal layer 15 side has the concavo-convex structure, and the face on the planarizing film 12 side is flat.

Figure 3A:
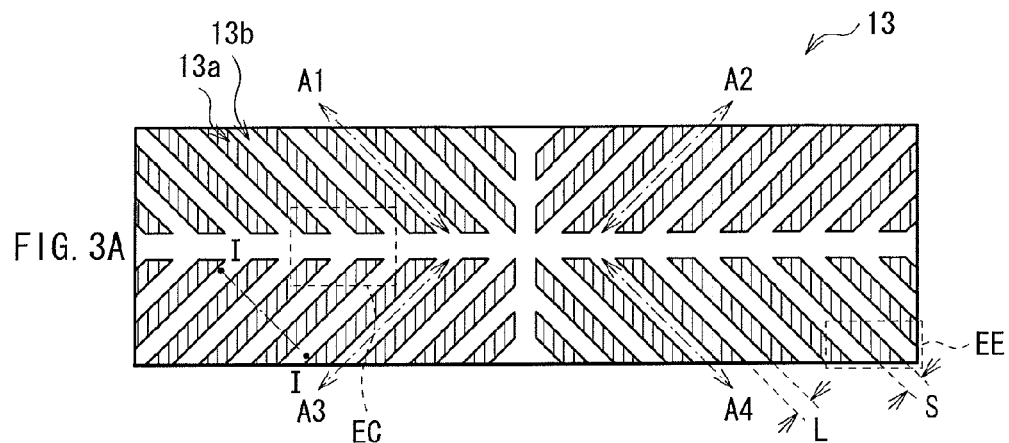
FIGS. 3A to 3C are plan views and an enlarged cross-sectional view of a pixel electrode illustrated in FIG. 2

FIG. 3A schematically illustrates an example of the planar structure of the pixel electrode 13. In this manner, for example, the concavo-convex structure provided in the pixel electrode 13 is formed in a predetermined pattern (concavo-convex pattern). That is, the concave faces 13a are provided to extend along a plurality of directions (here, four directions A1 to A4) within an electrode plane, and portions other than the concave faces 13a are the convex faces 13B. By such a concavo-convex pattern, regions having different alignment directions are formed (alignment is split) in the pixel 10, so the viewing angle characteristics are improved.

Figure 3B:
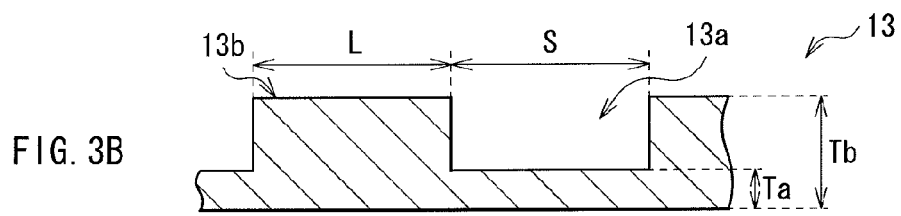

FIG. 3B illustrates part of the cross-sectional structure of the pixel electrode 13 in an enlarged manner. A width S of the concave face 13a is, for example, preferably 1 μm to 20 μm both inclusive, and a width L (=a gap (pitch) between the concave faces 13a) of the convex face 13b extending in the same direction as the concave face 13a is, for example, preferably 1 μm to 20 μm both inclusive. If the widths L and S are smaller than 1 μm, it is difficult to form the pixel electrode 13, and it is difficult to ensure the sufficient yield. Meanwhile, if the widths S and L are larger than 20 μm, when a drive voltage is applied, the favorable oblique electric field is unlikely to be generated between the pixel electrode 13 and the opposite electrode 17, and the alignment of the liquid crystal molecules as a whole is likely to be slightly disordered. In particular, more preferably, the width S is 2 μm to 10 μm both inclusive, and the width L is 2 μm to 10 μm both inclusive. Thereby, the sufficient yield is ensured, and the alignment of the liquid crystal molecules when the drive voltage is applied thereto becomes favorable.

A distance (a thickness Ta) from the concave face 13a to the rear surface of the pixel electrode 13 is, for example, preferably 50 nm to 250 nm both inclusive, and a distance (a thickness Tb) from the convex face 13b to the rear surface of the pixel electrode 13 is, for example, preferably 100 nm to 300 nm both inclusive. Although detail will be described later, the transmittance of the liquid crystal layer 15 when the voltage is applied thereto is varied according to the height of the step (difference between the thicknesses Ta and Tb) between the concave face 13a and the convex face 13b. However, the difference in step is preferably 50 nm or more. Thereby, it is possible to favorably control the alignment, ensure the sufficient yield, and prevent reduction of the transmittance and prolongation of the process time.

(Another Concavo-Convex Pattern Example in the Pixel Electrode)

The concavo-convex pattern is not limited to the pattern in which the concave faces 13a extend along the four directions, but various patterns, for example, a stripe shape and a V-shape may be adopted. In addition, the width S and the number of the concave faces 13a, and the width L and the number of the convex faces 13b may be arbitrarily set.

Figure 3C:
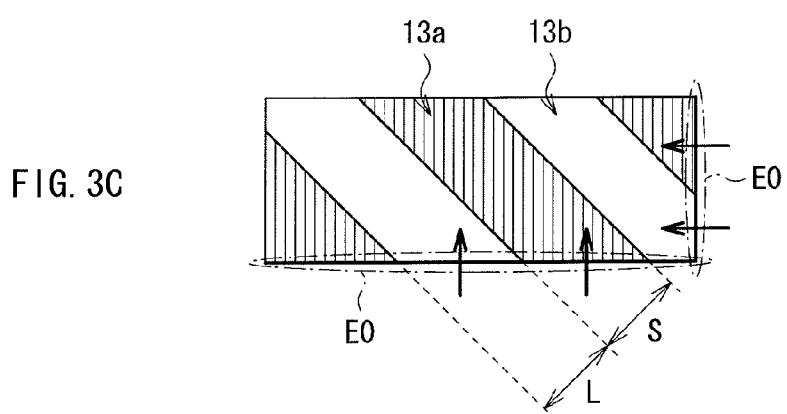
Figure 4A:
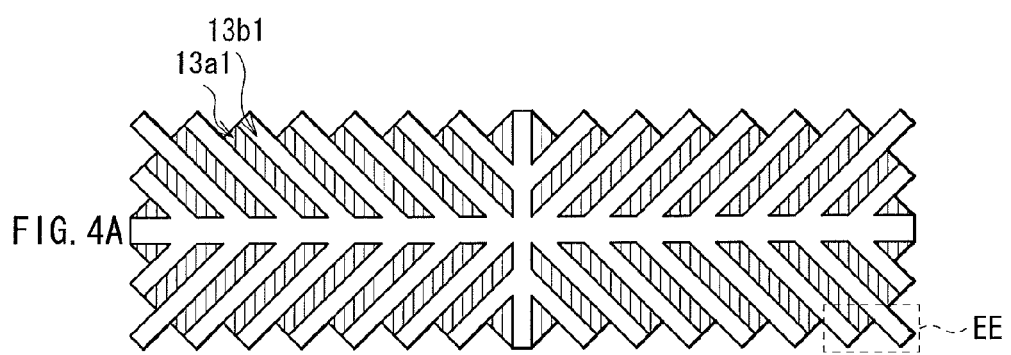
FIGS. 4A and 4B are plan views illustrating another structure of the pixel electrode.
Figure 4B:
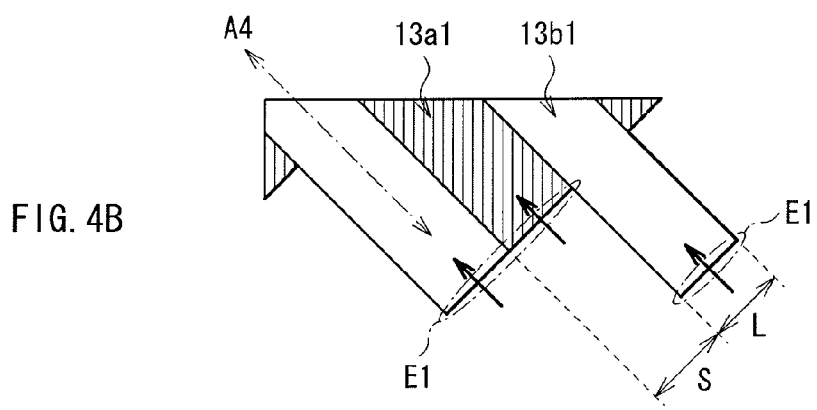

The plane shapes of the concave face 13a and the convex face 13b may be set, for example, as will be described next. For example, as illustrated in FIG. 4A, such a structure (hereinafter, referred to as a right-angle structure) may be adopted that an outer end portion E1 of a concave face 13a1 and a convex face 13b1 in an edge portion EE of the pixel electrode 13 is cut along the direction orthogonal to the extending direction of the concave face 13a1 and the convex face 13b1 (here, the direction A4). Here, as illustrated in FIG. 3C, for example, in the case of the structure in which an outer end portion E0 in the edge portion EE is obliquely cut along each side of a rectangular shape of the pixel electrode 13, the liquid crystal molecules in the vicinity of the outer end portion E0 tilt in the direction of arrow (thick line), and there is a risk that this inhibits the alignment control. Thus, as illustrated in FIG. 4B, if the outer end portion E1 has the above-described right-angle structure, the liquid crystal molecules in the vicinity of the end portion E1 are likely to tilt along the direction A4, and the alignment is easily controlled.

Figure 5A:
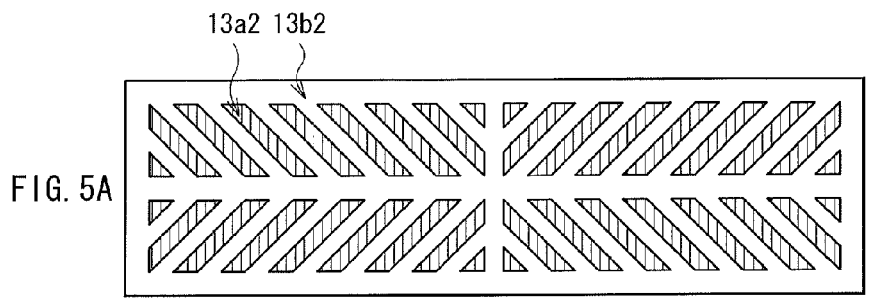
FIGS. 5A to 5E are plan views illustrating another structure of the pixel electrode.
Figure 5B:
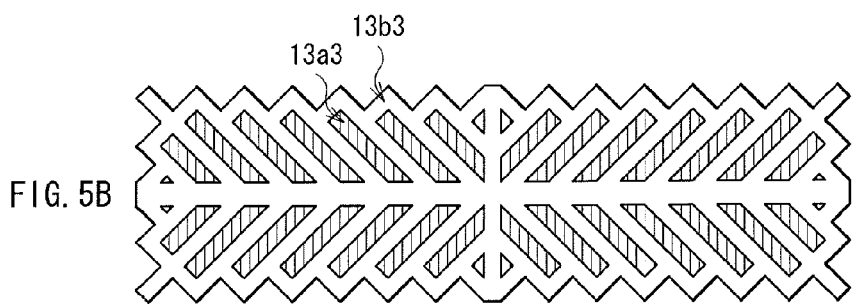
Figure 5C:
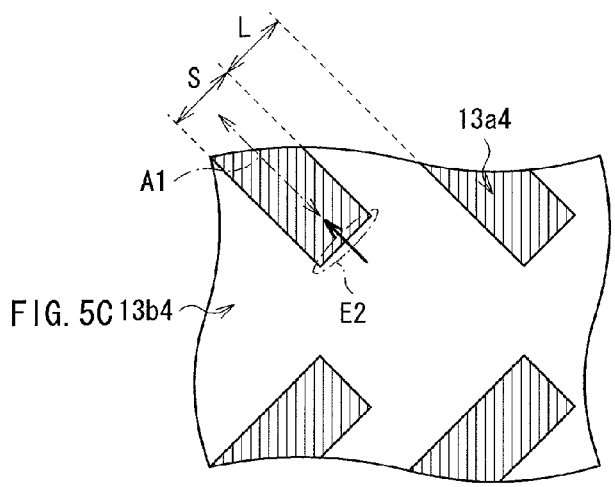
Figure 5D:
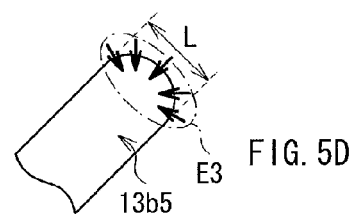

Alternatively, the planar structures as illustrated in FIGS. 5A to 5E may be adopted. FIGS. 5A and 5B illustrate the planar structure of the pixel electrodes as a whole, FIG. 5C illustrates part of the pixel electrodes, and FIG. 5D illustrates one concave face in enlarged manner. As illustrated in FIGS. 5A and 5B, in an edge portion of the pixel electrode 13, the structure in which convex faces 13b2 are connected to each other, and the structure in which convex faces 13b3 are connected to each other may be adopted. In the other way around, although it is not illustrated in the figure, in the edge portion, concave faces 13a2 may be connected to each other, and concave faces 13a3 may be connected to each other.

As illustrated in FIG. 5C, the right-angle structure in which an inner end portion E2 (a portion corresponding to a region EC in FIG. 3A) of a concave face 13a4 is cut along the direction orthogonal to the extending direction of the concave face 13a4 (here, the direction A1) like the above-described outer end portion E1 may be adopted. In addition, both the outer end portion E1 and the inner end portion E2 of the concave face 13a4 may have the right-angle structure.

Figure 5E:
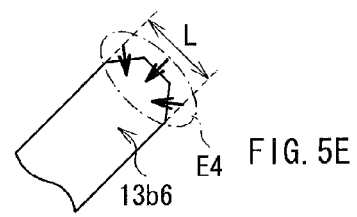

Further, instead of the above-described right-angle structure, for example, as illustrated in FIG. 5D, an outer end portion E3 of each convex face 13b5 may have a roundly-formed R-shape. Thereby, as illustrated with arrows of FIG. 5D, it is possible to align the liquid crystal molecules in the arbitrary directions. Alternatively, for example, as illustrated in FIG. 5E, an outer end portion E4 may have a polygonal shape without being limited to the R-shape. Although it is not illustrated in the figure, one or both of the outer end portion and the inner end portion of each concave face may have the R-shape or the polygonal shape described above.

Figure 6A:
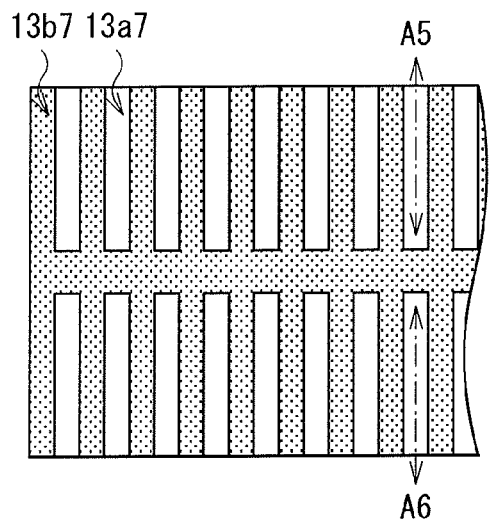
FIGS. 6A and 6B are plan views illustrating another structure of the pixel electrode.
Figure 6B:
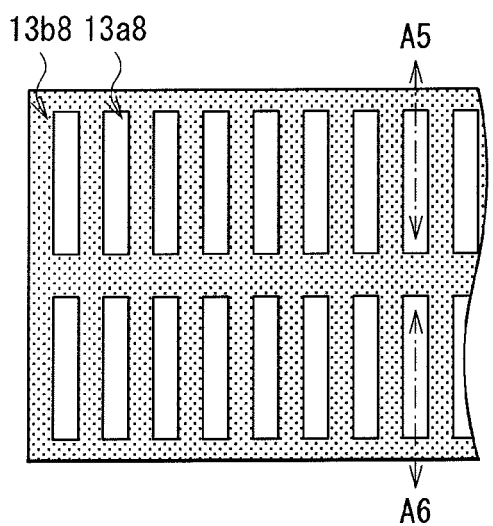

Although the description has been given with the example of the pixel electrode structure (the structure in which the alignment is split in the four regions) in which the concave faces and the convex faces are provided to extend along the four directions A1 to A4, the extending directions of the concave faces and the convex faces are not limited to these. For example, as illustrated in FIG. 6A, the structure (the structure in which the alignment is split in two regions) in which concave faces 13a7 are provided to extend along two directions A5 and A6 within the electrode plane, and portions other than the concave faces 13a7 are convex faces 13b7 may be adopted. Further, as illustrated in FIG. 6B, the structure in which convex faces 13b8 are connected to each other in the edge portion of the pixel electrode may be adopted. In the case of such two-divided region structures, optical axes of the polarizing plates 19 and 20 are shifted at 45° from those of a four-divided region structure.

The facing substrate 18 includes, for example, a color filter (not illustrated in the figure) formed by aligning red (R), green (G), and blue (B) filters on the surface of the glass substrate (a face on the opposite electrode 17 side or a face on the polarizing plate 20 side). However, the color filter may be provided on the facing substrate 18, or may be provided on the drive substrate 11 (a COA (color filter on array) structure may be adopted).

The opposite electrode 17 is, for example, formed of a transparent conductive film of ITO or the like, and is provided (to face all the pixel electrodes 13) as a common electrode for each pixel 10. Here, the face on the liquid crystal layer 15 side of the opposite electrode 17 is a flat face without a slit, a gap, and the like. However, it is enough if the opposite electrode 17 is an electrode without a notched portion such as the gap and the slit, and, for example, the face on the liquid crystal layer 15 side may be a concavo-convex face, or may be provided with a step.

The alignment films 14 and 16 are, for example, vertically alignment films, and align the liquid crystal molecules (for detailed description, the liquid crystal molecules in the vicinity of the alignment films 14 and 16) in the liquid crystal layer 15 so that the long-axis directions (directors) of those liquid crystal molecules are in the direction approximately vertical to the substrate surface. As the alignment films 14 and 16, for example, a vertically aligning agent such as polyimide and polysiloxane is used.

The liquid crystal layer 15 includes the vertical alignment type liquid crystal molecules. In the liquid crystal layer 15, for example, the liquid crystal molecules has a shape symmetrically rotatable around the long axis and the short axis, and exhibits the negative dielectric constant anisotropy (characteristics in which the dielectric constant in the long axis direction is smaller than that of the short axis direction).

Figure 7:
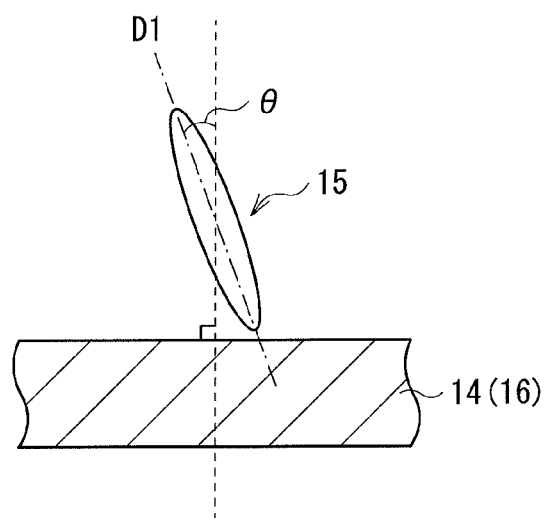
FIG. 7 is a schematic view for explaining a tilt angle of a liquid crystal molecule.

As illustrated in FIG. 7, in the liquid crystal layer 15, the liquid crystal molecule (a liquid crystal molecule 15a) in the vicinity of the interface of the alignment film 14 and the liquid crystal layer 15, or the interface of the alignment film 16 and the liquid crystal layer 15 is aligned so that a long axis direction D1 is substantially vertical to the substrate surface by control from the alignment films 14 and 16, and the liquid crystal molecule is held to slightly tilt from the vertical direction. That is, a so-called pre-tilt is provided to the liquid crystal molecule in the vicinity of the interface of the alignment film 14 and the liquid crystal layer 15, or the interface of the alignment film 16 and the liquid crystal layer 15, an inclination angle (a tilt angle) A from the vertical direction of the liquid crystal molecule 15a is, for example, approximately 1° to 4° both inclusive. As the tilt angle θ is large, the rise response speed is fast, but the black luminance when no voltage is applied is reduced, so the contrast is deteriorated. Such a pre-tilt is held by polymers in the vicinity of the interface of the alignment film 14 and the liquid crystal layer 15, and the interface of the alignment film 16 and the liquid crystal layer 15, and the other liquid crystal molecules (for example, the liquid crystal molecules in the vicinity of the middle in the thickness direction of the liquid crystal layer 15) are orientated in the same direction by following the alignment of the liquid crystal molecules in the vicinity of the interfaces.

The polarizing plates 19 and 20 are arranged, for example, to be in the cross-nichols state to each other. The polarizing plates 19 and 20 shut off the light from the backlight 3 when no voltage is applied (the off-state), and transmits the light when the voltage is applied (the on-state). That is, the polarizing plates 19 and 20 are bonded onto the drive substrate 11 and the facing substrate 18, respectively, so that the liquid crystal is the normally black type.

Method of Manufacturing the Liquid Crystal Display 1

(1. Step of Sealing the Panel)

Figure 8A:
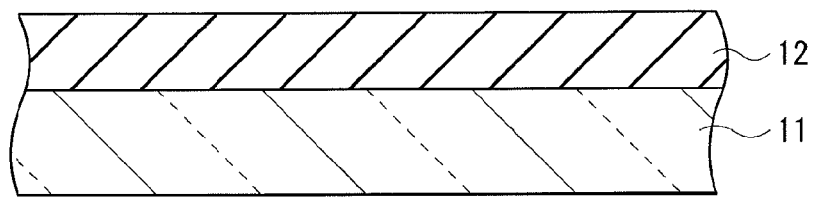
FIGS. 8A to 8C are cross-sectional views for explaining a method of manufacturing of the liquid crystal display (a step of forming the pixel electrode) illustrated in FIG. 1.
Figure 8B:
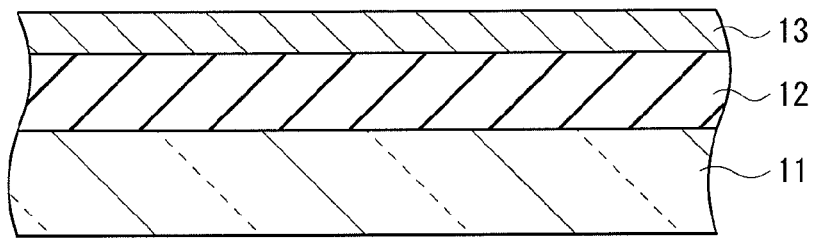
Figure 8C:
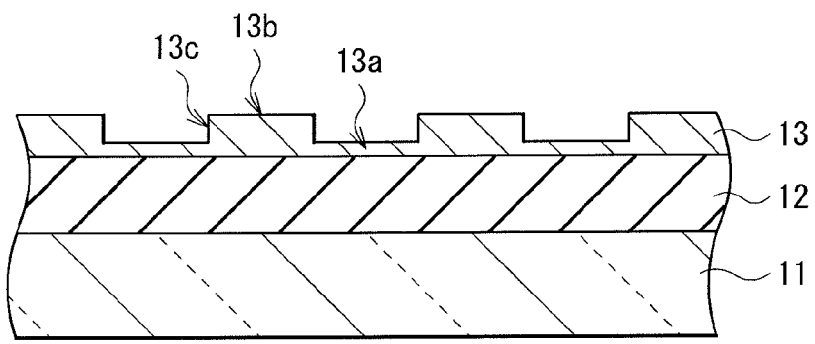

The liquid crystal display 1 is manufactured, for example, as will be described next. That is, first, as illustrated in FIG. 8A, the planarizing film 12 is, for example, formed to cover the surface of the drive substrate 11 by a spin coat method. In the case where the inorganic insulating film is formed instead of the planarizing film 12, the silicon oxide film described above or the like may be formed by, for example, a CVD method. After this, as illustrated in FIG. 8B, for example, the pixel electrode 13 of ITO is formed over the whole surface of the planarizing film 12 by, for example, an evaporation method and a sputtering method. Next, as illustrated in FIG. 8C, selective regions (regions corresponding to the concave faces 13a) of the pixel electrode 13 are removed by, for example, half-etching by a photolithography, and the concavo-convex structures each constituted of the concave face 13a, the convex face 13b, and the vertical face 13c are thereby formed. Contact holes are provided in the planarizing film 12, and the pixel electrodes 13 are electrically connected to the drive circuit formed above the drive substrate 11 through the contact holes, respectively.

The vertically aligning agent is, for example, applied by the spin coat method onto the surface of the pixel electrode 13 formed in this manner, specifically, so as to cover the concave face 13a, the convex face 13b, and the vertical face 13c, and baked, thereby forming the alignment film 14.

Meanwhile, after the opposite electrode 17 is, for example, formed by the evaporation method or the sputtering method onto the surface of the facing substrate 18, the vertically aligning agent is, for example, applied by the spin coat method onto the surface of the opposite electrode 17, and basked, thereby forming the alignment film 16.

After this, for example, a UV curing or thermoset seal section is printed on a periphery region of the drive substrate 11, and, for example, the liquid crystal layer 15 into which UV curing monomers are mixed is instilled into a region surrounded by the seal section. After this, for example, the facing substrate 18 is stacked on the drive substrate 11 with a spacer of a photosensitive acryl resin in between, and the seal section is cured. In this manner, a panel seal body in which the liquid crystal layer 15 is sealed between the drive substrate 11 and the facing substrate 18 is formed.

(2. Step of Providing a Pre-Tilt)

Figure 9A:
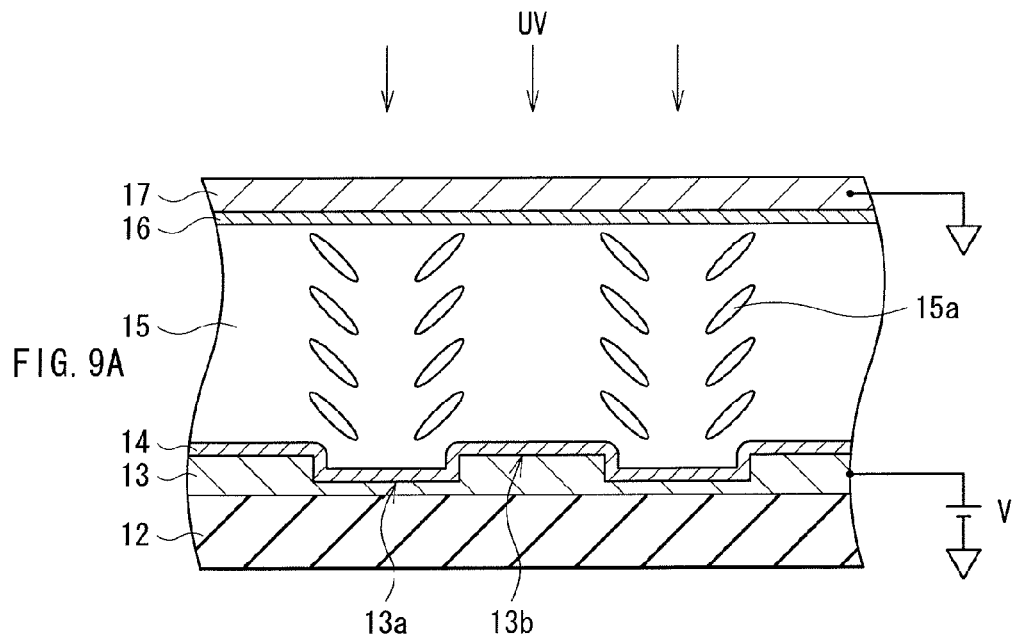
FIGS. 9A and 9B are cross-sectional schematic views for explaining a step (a step of providing a pre-tilt) subsequent to FIGS. 8A to 8C.

Next, in the panel seal body formed as described above, exposure (UV irradiation) is performed on the liquid crystal layer 15 while the voltage is applied thereto, and the pre-tilt is provided to the liquid crystal layer 15. Specifically, as illustrated in FIG. 9A, a voltage V is applied to the liquid crystal layer 15 through the opposite electrode 17 and the pixel electrode 13.

Figure 9B:
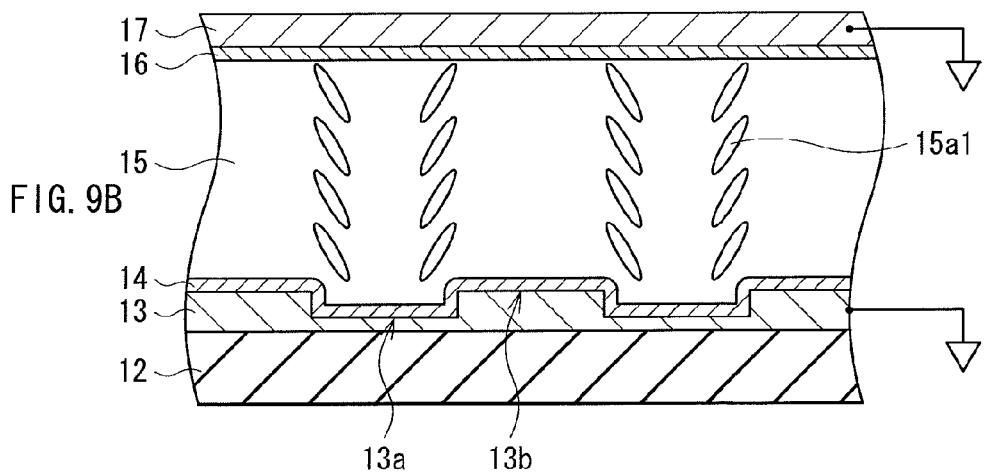

By this voltage application, in the liquid crystal layer 15, distortion of the electric field (lateral electric field) is generated due to height difference (step) between the concave face 13a and the convex face 13b formed on the surface of the pixel electrode 13. Thereby, the liquid crystal molecules 15a tilt in response to the concavo-convex pattern of the pixel electrode 13. The UV irradiation is performed on the tilting liquid crystal molecules 15a, and the monomers mixed into the liquid crystal layer 15 are thus cured in the vicinity of the interface of the alignment film 14 and the liquid crystal layer 15, and the interface of the alignment film 16 and the liquid crystal layer 15. After that, as illustrated in FIG. 9B, when the liquid crystal layer 15 is in the no-voltage application state again, the polymers formed in the vicinity of the interfaces hold the liquid crystal molecules 15a which slightly tilt from the vertical direction. In this manner, the pre-tilt angle 0 is provided to the liquid crystal molecule 15a as illustrated in FIG. 7.

After the pre-tilt is provided as described above, the polarizing plate 19 is bonded onto the rear surface of the drive substrate 11 of the panel seal body, and the polarizing plate 20 is bonded onto the surface of the opposite electrode 18, so the polarizing plates 19 and 20 are arranged to be in the cross-nichols state to each other. Thereby, the liquid crystal display 1 illustrated in FIG. 1 is completed.

The method of providing the pre-tilt is not limited to that described above, and it is enough if the method includes a step of exposing the liquid crystal layer 15 while the voltage is applied thereto, after at least the liquid crystal is sealed. For example, the pre-tilt may be provided by using a special alignment film which will be described next. That is, in a side chain, an alignment film having a polymer including a group for providing the pre-tilt, and a group (a photosensitive group) for fixing the provided pre-tilt, an alignment film including a photosensitive monomer, or the like may be used. Such a special alignment film is formed on one or both of the drive substrate 11 side and the facing substrate 18 side (however, in the case where the special alignment film is formed only on one of the drive substrate 11 side and the facing substrate 18 side, the vertically alignment film is formed on the other of the drive substrate 11 side and the facing substrate 18 side), and after the VA type liquid crystal containing no monomer is sealed, the exposure is performed onto the liquid crystal layer 15 while the voltage is applied thereto. It is possible to provide the pre-tilt also by such a method.

Actions of the Liquid Crystal Display 1

(Picture Display Operation)

In the liquid crystal display 1, the drive voltage based on the external input signal Din is applied between the pixel electrode 13 and the opposite electrode 17, as will be described below, and a picture is thereby displayed. Specifically, in response to the control from the timing controlling section 61, the gate driver 52 sequentially supplies a scanning signal to the gate line connected to each pixel 10, and the data driver 51 supplies a picture signal based on the external input signal Din to a predetermined source line. Thereby, the pixel 10 positioned in the intersection of the source line to which the picture signal is supplied, and the gate line to which the scanning signal is supplied is selected, and the drive voltage is applied to that pixel 10.

In the selected pixel 10, when the drive voltage is applied thereto, the alignment state of the liquid crystal molecules 15a included in the liquid crystal layer 15 is varied in accordance with the voltage applied between the pixel electrode 13 and the opposite electrode 17. Specifically, when the drive voltage is applied from the no voltage application state, the liquid crystal molecules 15a positioned in the vicinity of the alignment films 14 and 16 tilt, and the liquid crystal molecules 15a tilt sequentially toward the middle in the thickness direction of the liquid crystal layer 15 by following the operation of the liquid crystal molecules 15a positioned in the vicinity of the alignment films 14 and 16. At this time, the tilt angle is provided to the liquid crystal molecule 15a, so the liquid crystal molecule 15a easily tilts in its own tilt direction, and the response speed to the drive voltage is thus shortened. The result is that the optical characteristics in the liquid crystal layer 15 are changed, and the light entering into the liquid crystal panel 2 from the backlight 3 is modulated and emitted. In the liquid crystal device 1, a picture is displayed in this manner.

Figure 10:
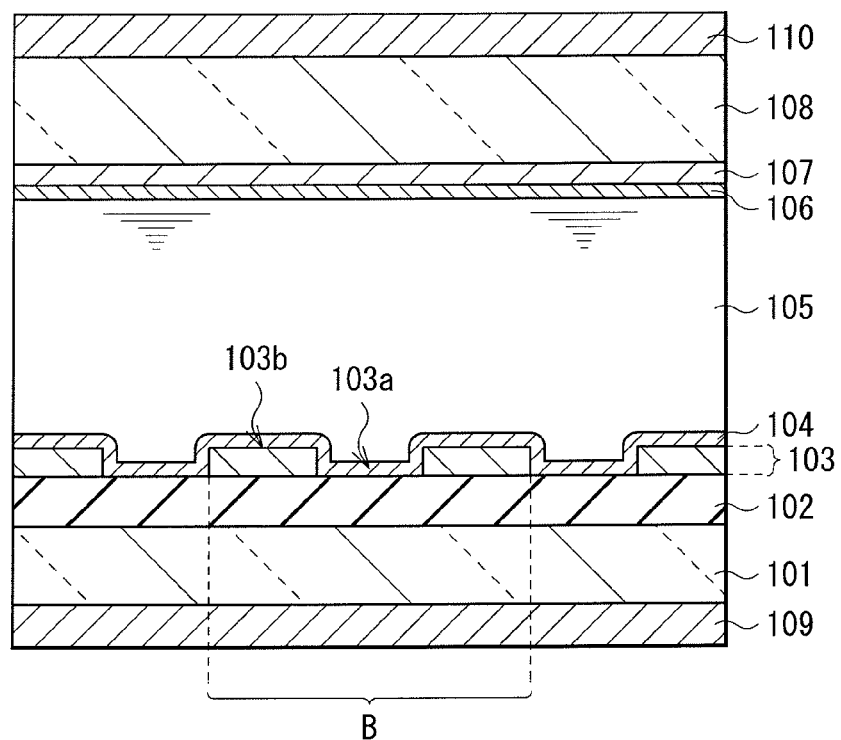
FIG. 10 is a cross-sectional view illustrating a partial region of a pixel in a liquid crystal display according to a comparative example.

Here, a liquid crystal display according to a comparative example will be described. FIG. 10 illustrates part of the cross-sectional structure of a pixel of the liquid crystal display according to the comparative example. In the liquid crystal display, a liquid crystal layer 105 is sandwiched between a drive substrate 101 and a facing substrate 108, and an incidence-side polarizing plate 109 and an emission-side polarizing plate 110 are bonded onto outer faces of the drive substrate 101 and the facing substrate 108, respectively. A pixel electrode 103 is disposed for each pixel above a face on the liquid crystal layer 105 side of the drive substrate 101 with a planarizing film 102 in between, and an alignment film 104 is formed to cover the surface of the pixel electrode 103. On a face on the liquid crystal layer 105 side of the facing substrate 108, an opposite electrode 107 is disposed over the whole surface of an effective display area, and an alignment film 106 is formed to cover the surface of the opposite electrode 107. That is, in the liquid crystal display of the comparative example, a so-called fine-slit structure in which the pixel electrode 103 includes a plurality of slits 103a is employed.

Figure 11:
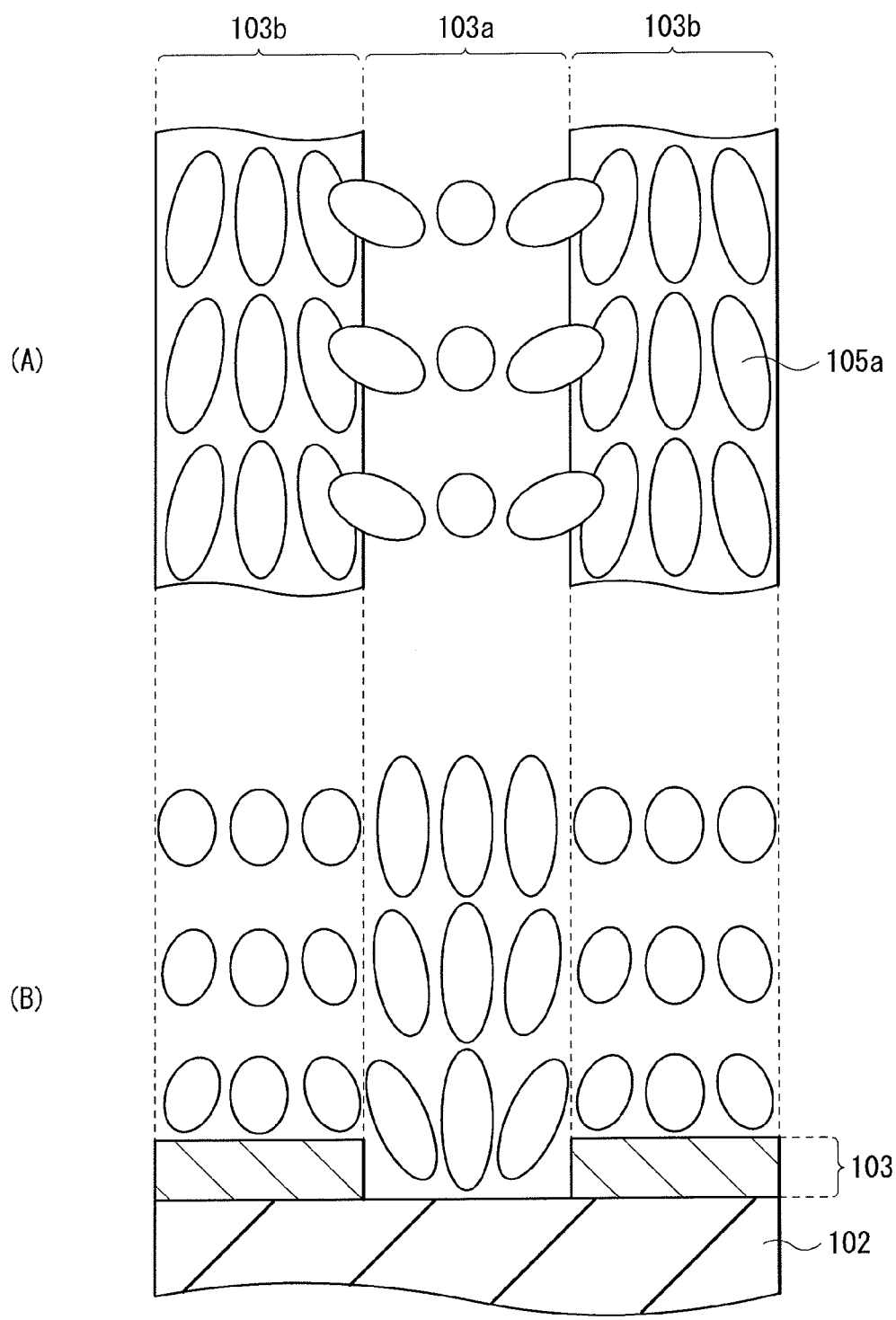
FIG. 11 is a plan view and a cross-sectional view schematically illustrating the alignment state of liquid crystal molecules in the vicinity of an electrode in the comparative example.

FIG. 11 schematically illustrates the alignment state of the liquid crystal molecules when the voltage is applied thereto in the above-described comparative example. Part (A) in FIG. 11 illustrates the vicinity of the pixel electrode 103 in a region B in FIG. 10, as viewed from the top face, and part (B) in FIG. 11 corresponds to its cross-sectional structure. The alignment film 104 is not illustrated in the figure for the sake of simplicity. In this manner, in the comparative example, there is the slit 103a in the pixel electrode 103, that is, there is a notched portion in the electrode, so the voltage is not applied to a region immediately above the slit 103a, and the liquid crystal molecules are unlikely to be aligned (to tilt) in the desired direction. Thus, the liquid crystal molecules 15a do not tilt, but are aligned to stand in the direction substantially vertical to the substrate surface. In such an alignment state, the amount of light transmission is reduced in the region corresponding to the slit 103a, and the transmittance is reduced.

Figure 12:
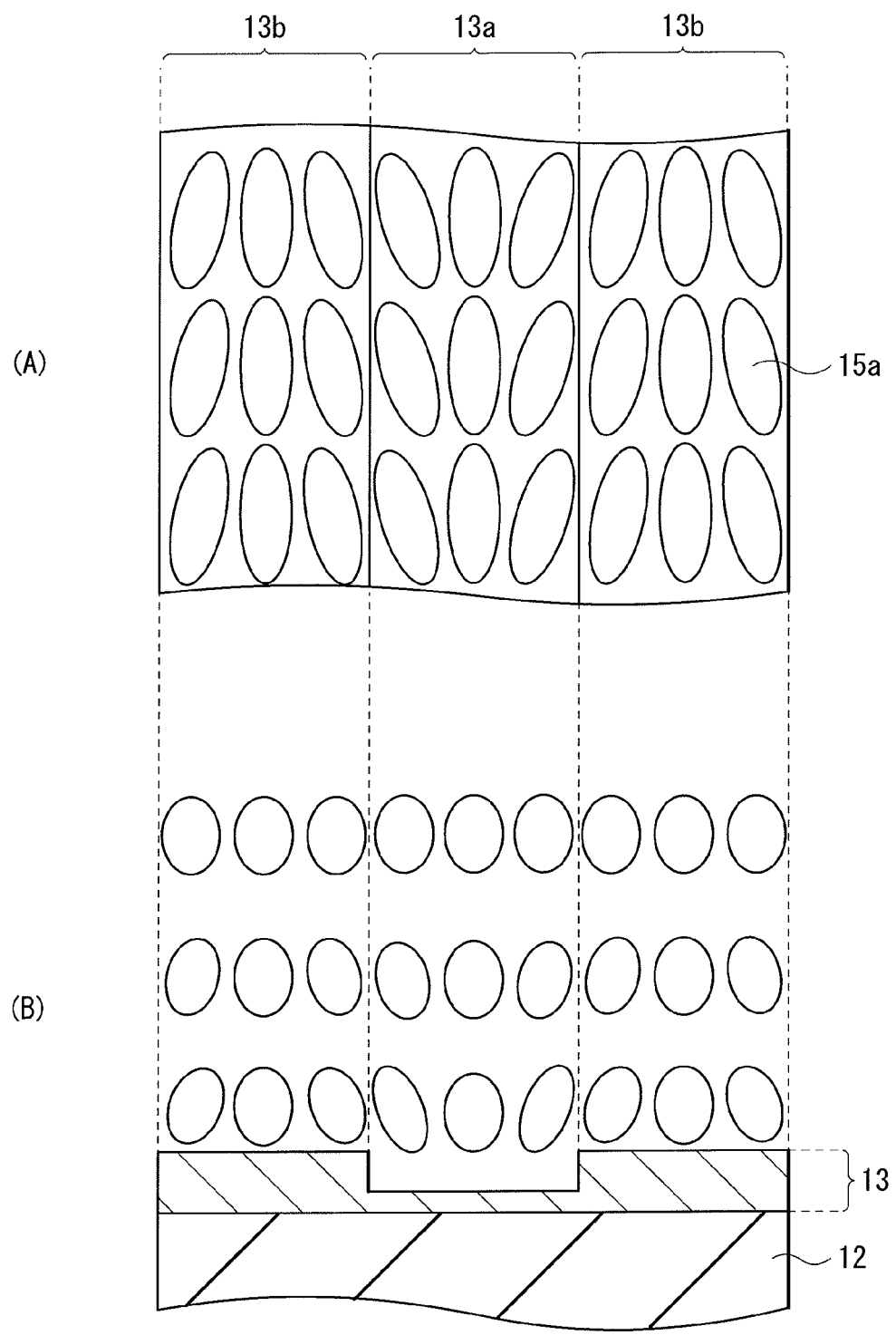
FIG. 12 is a plan view and a cross-sectional view schematically illustrating the alignment state of the liquid crystal molecules in the vicinity of the electrode in the embodiment.

On the other hand, in this embodiment, the alignment state of liquid crystal molecules 105a when the voltage is applied thereto are as will be described below. FIG. 12 schematically illustrates the alignment state of the liquid crystal molecules 15a when the voltage is applied thereto in this embodiment. Part (A) in FIG. 12 illustrates the vicinity of the pixel electrode 13 as viewed from the top face, and part (B) in FIG. 12 corresponds to its cross-sectional structure. The alignment film 14 is not illustrated in the figure for the sake of simplicity. In this manner, although the pixel electrode 13 includes the concavo-convex structure on its surface, there is no notched portion in the electrode, such as the slit, so it is possible to suppress generation of insufficient voltage application not only on the convex face 13b, but also on the concave face 13a. Thus, the liquid crystal molecules 15a tilt even above the concave face 13a. Therefore, the reduction of the transmittance accompanied by insufficiency of the alignment of the liquid crystal molecules generated in the local regions as described above is suppressed.

Figure 13:
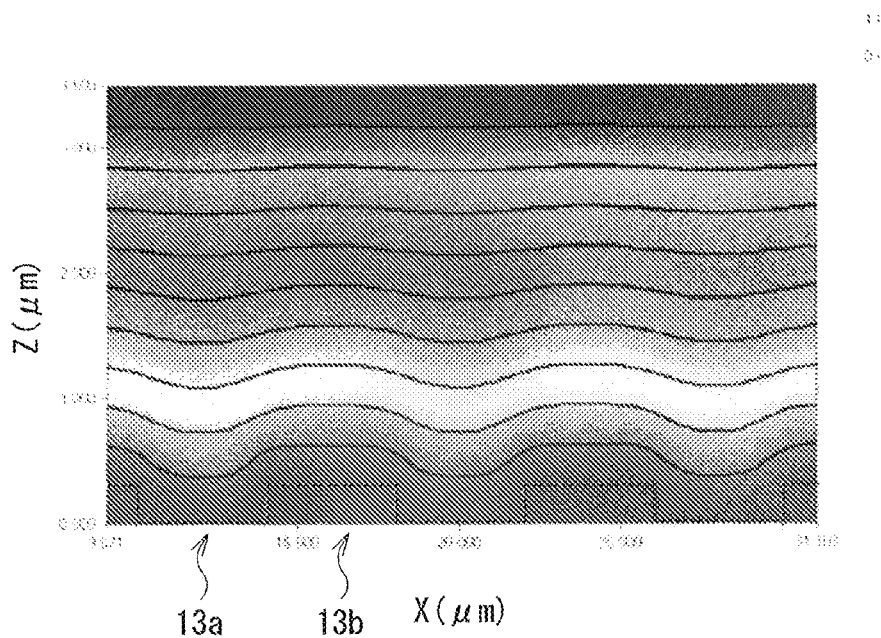
FIG. 13 is a characteristics view illustrating an electric field distribution (equalpotential distribution) in the embodiment.
Figure 14:
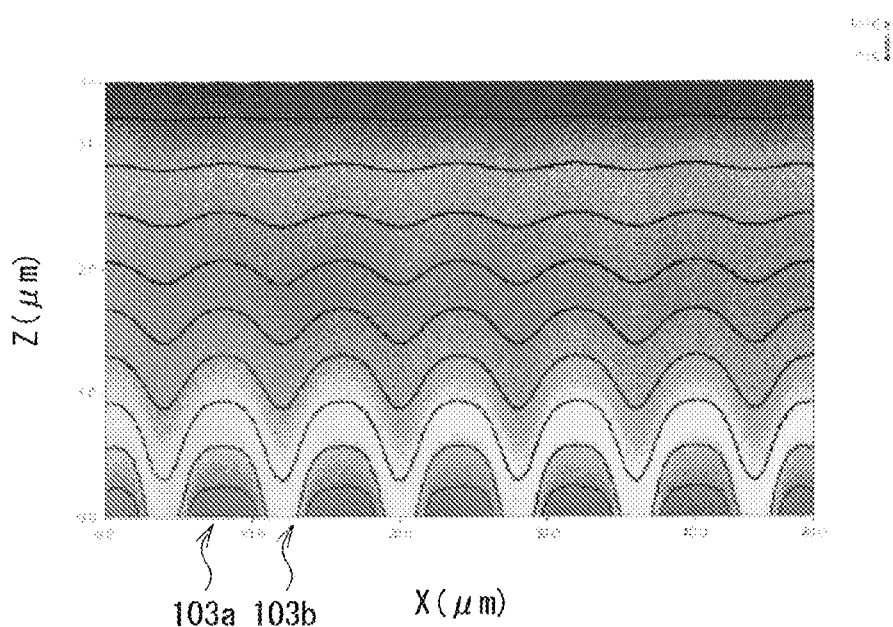
FIG. 14 is a characteristic view illustrating an electric field distribution (equalpotential distribution) in the comparative example.

Here, FIG. 13 illustrates the electric field distribution (equalpotential distribution) of the liquid crystal layer 15 when the voltage is applied thereto. However, in FIG. 13, X (um) represents the scale in the direction orthogonal to the extending direction of the concave face 13a on the substrate surface. Z (μm) represents the scale in the thickness direction of the liquid crystal layer 15, Z=0 represents the pixel electrode 13 side (the alignment film 14 side), and Z=3.5 μm represents the opposite electrode 17 side (the alignment film 16 side). The width S of the concave face 13a of the pixel electrode 13 was 4 μm, the thickness Ta was 50 nm, the width L of the convex face 13b was 4 μm, and the thickness Tb was 300 nm. The vertically aligned film (JALS2131-R6: manufactured by JSR Co., Ltd.) was applied onto a first sub-electrode 12A, dried for 80 seconds at 80° C. on a hot plate, and then baked for 60 minutes at 200° C. in a clean oven in a nitride atmosphere, thereby forming the alignment films 14 and 16. As the liquid crystal layer 15, the VA liquid crystal material into which the acryl monomers (A-BP-2E: manufactured by Shin-Nakamura Chemical Co., Ltd.) were mixed in an amount of 0.3 wt % was used, and the thickness of the liquid crystal layer 15 was 3.5 μm. Further, FIG. 14 illustrates the electric field distribution of the liquid crystal layer 105 of the comparative example. The structure conditions and the process conditions of the part other than the pixel electrode were the same as those described above. In the comparative example, it can be seen from FIG. 14 that, in particular, the voltage applied to the region corresponding to the slit 103a in the region on the pixel electrode side is lower than the voltage applied to the region corresponding to an electrode portion 103b. Meanwhile, in this embodiment as illustrated in FIG. 13, it can be seen that the voltage approximately at the same level as the voltage applied to the region corresponding to the convex face 13b is applied to the region corresponding to the concave face 13a.

Figure 15A:
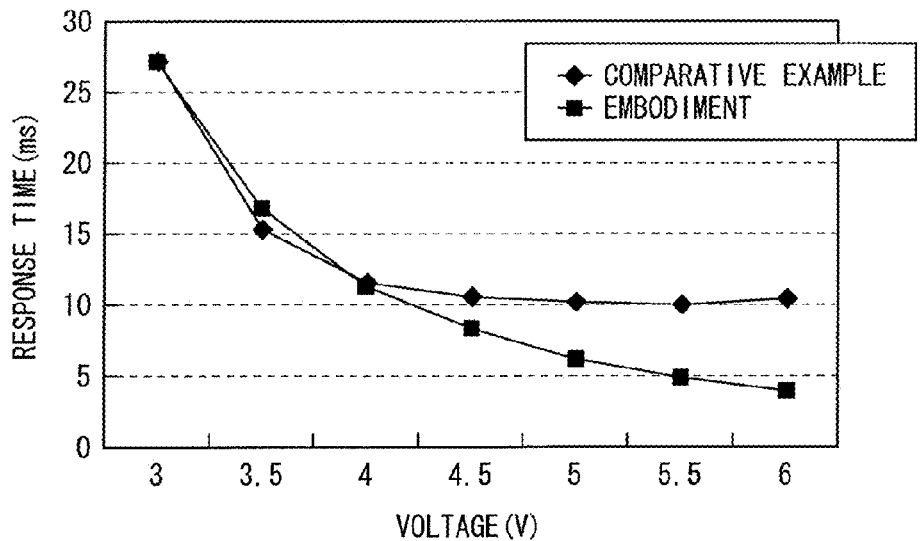
FIGS. 15A and 15B are characteristic views illustrating the relation between a voltage and a response time, and a characteristic view illustrating the relation between the voltage and the transmittance.
Figure 15B:
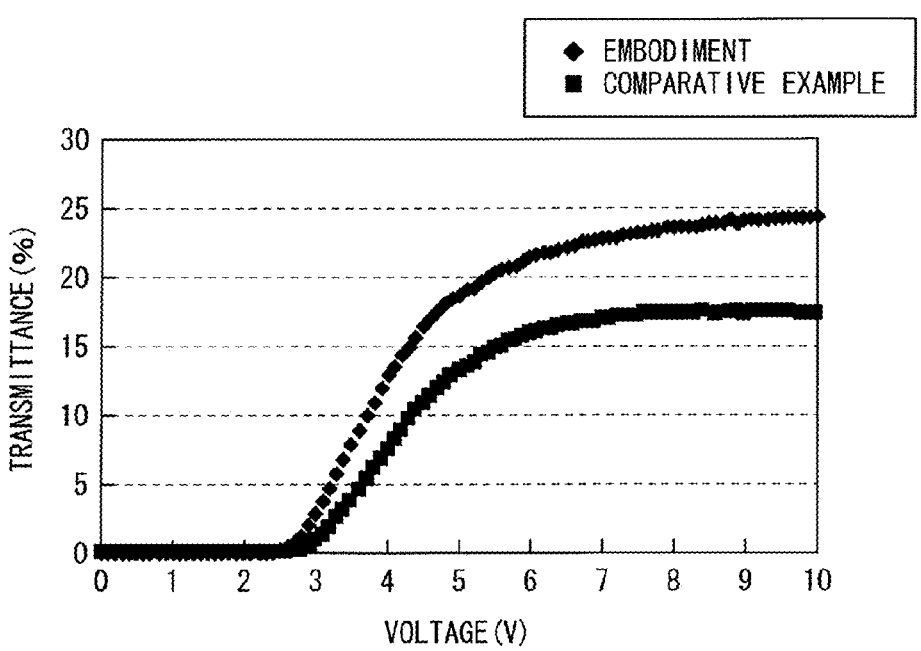

FIG. 15A illustrates the relation between a voltage (V) and the response time (ms: millisecond), and FIG. 15B illustrates the relation between the voltage (V) and the transmittance (%). As illustrated in FIG. 15A, it can be seen that it is possible to realize the voltage response characteristics more favorable than the voltage response characteristics of the comparative example in which the fine-slit structure is provided. Meanwhile, as illustrated in FIG. 15B, in this embodiment, the transmittance is improved more drastically than the transmittance of the comparative example.

Figure 16A:
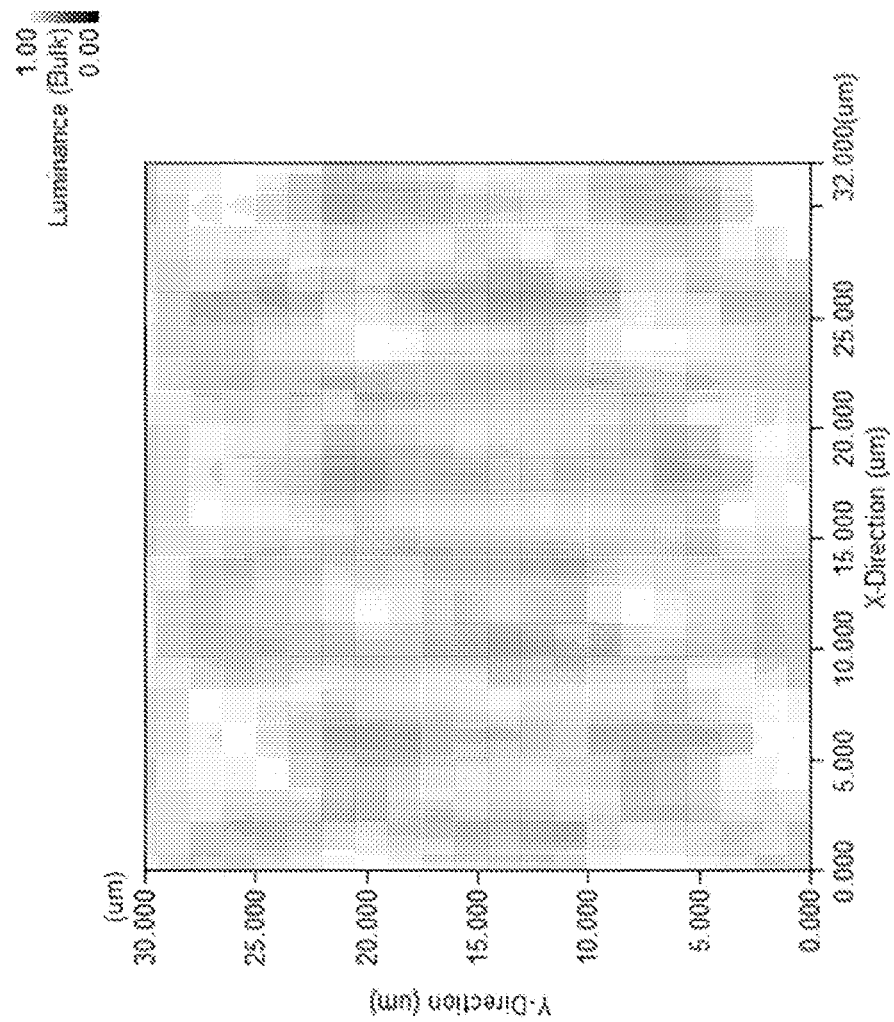
FIGS. 16A and 16B are plan views illustrating measurement results of the transmittance distribution.
Figure 16B:
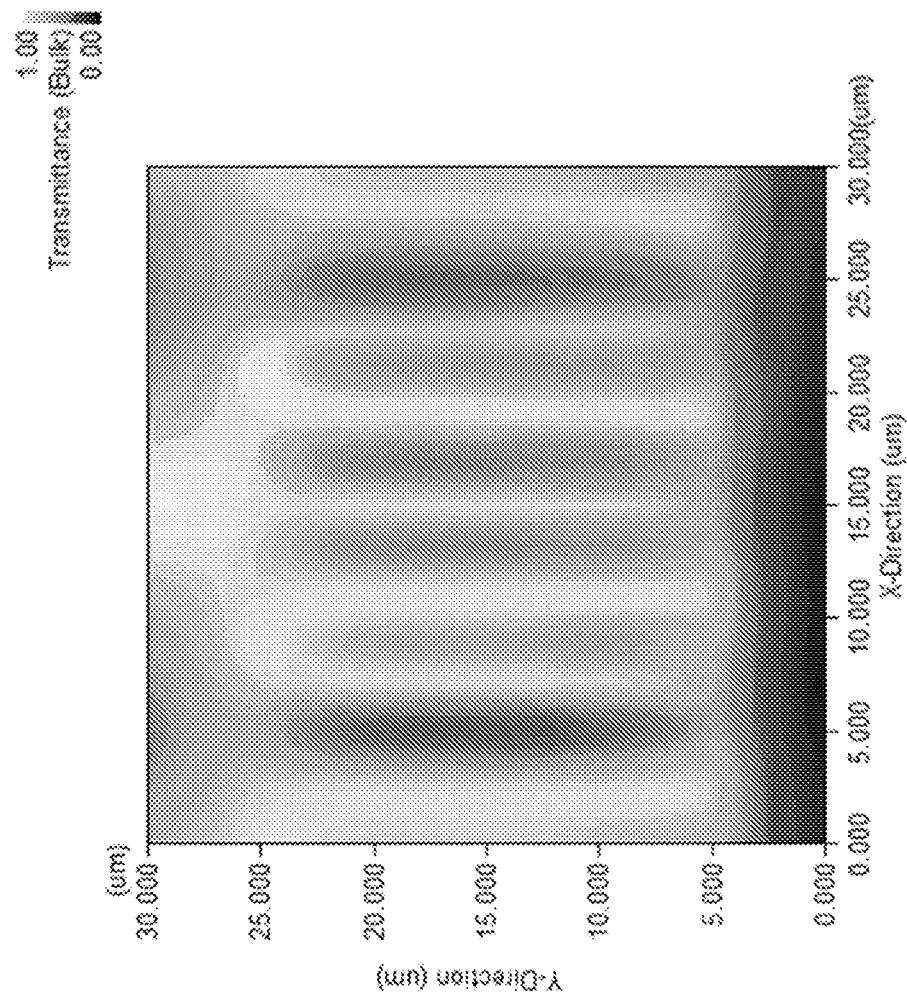

Simulation results of the transmittance distribution are illustrated in FIG. 16A as an example. However, Y (μm) represents the extending direction of the concave face 13a on the substrate surface. The dimension in an X-Y plane of the pixel electrode 13 was 30 μm×30 μm, and each width of the concave face 13a and the convex face 13b was 4 μm. Further, the thickness of the liquid crystal layer 15 was 3.5 μm, the application voltage was 7.5 V, and the wavelength of the incident light was 550 μm. In addition, FIG. 16B is the transmittance distribution of the fin-slit structure in which the slit with a width of 4 μm is provided in the pixel electrode at an interval of 4 μm. The conditions of the fine-slit structure are the same as those described above, except that the pixel electrode was provided with the slit. In this manner, by providing the concave-convex structure in the pixel electrode, the dark lines are reduced more and the transmittance is improved more, as compared with those of the fine-slit structure, and the uniform transmittance distribution is easily realized. However, each of FIGS. 16A and 16B illustrates the transmittance distribution with black-and-white shading (the transmittance is high as the shading is close to white, and the transmittance is low as the shading is close to black).

As described above, in this embodiment, because the concavo-convex structure is provided, specifically, the concavo-convex structure of the concave face 13a, the convex face 13b, and the vertical face 13c is provided on the face on the liquid crystal layer 15 side of the pixel electrode 13, it is possible to generate the electric field distortion in the liquid crystal layer 15 when the voltage is applied thereto. Therefore, it is possible to efficiently provide the pre-tilt. Meanwhile, it is possible to suppress the reduction of the application voltage in the local region, and the result is that it is possible to suppress the reduction of the transmittance. Therefore, it is possible to realize the high transmittance while the favorable voltage response characteristics are maintained.

Hereinafter, modifications (Modification 1 to Modification 4) will be described. In addition, components which are the same as in the first embodiment have been given the same reference characters, and descriptions will be omitted.

2. Modification 1

Figure 17:
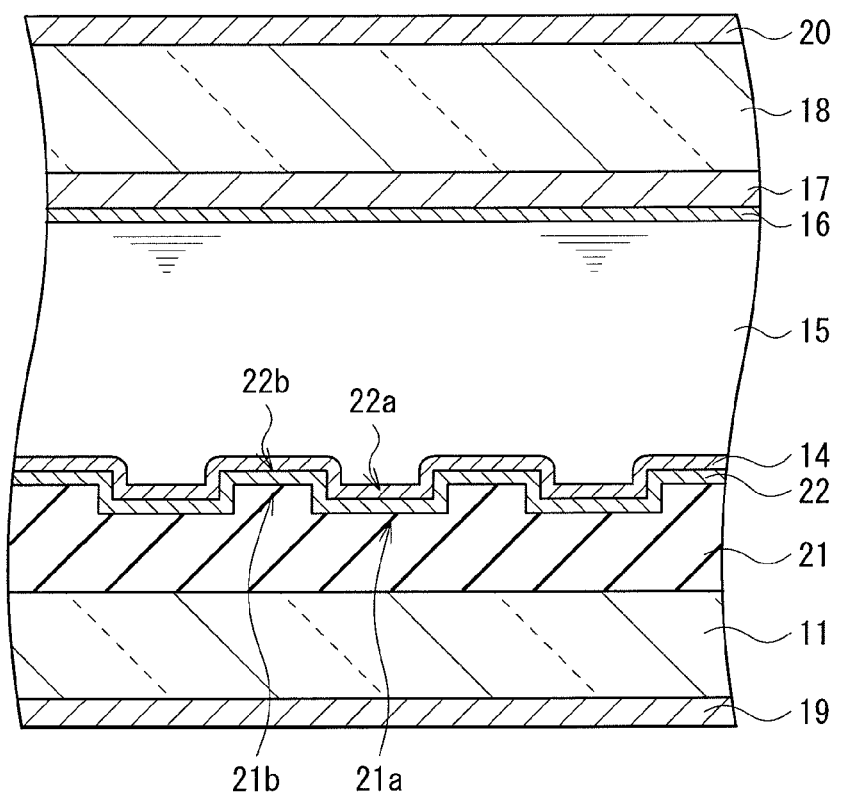
FIG. 17 is a cross-sectional view illustrating the partial region of the pixel in the liquid crystal display panel according to Modification 1.

FIG. 17 illustrates the cross-sectional structure (corresponds to part of the pixel) of the liquid crystal display panel in the liquid crystal display according to Modification 1. Like the liquid crystal display panel 2 of the above-described embodiment, in the liquid crystal display panel of this modification, the liquid crystal layer 15 is sandwiched between the drive substrate 11 and the facing substrate 18, and the polarizing plates 19 and 20 are bonded onto the outer faces of the drive substrate 11 and the facing substrate 18, respectively. A planarizing film 21 is formed on the drive substrate 11 so as to cover the surface of the drive substrate 11, and a pixel electrode 22 is disposed for each pixel 10 on the planarizing film 21. In such a structure, in this modification, the face on the liquid crystal layer 15 side of the pixel electrode 22 has the concave-convex structure, and the face on the liquid crystal layer 15 side of the opposite electrode 17 is flat.

However, in this modification, the concavo-convex structure is formed on the surface of the planarizing film 21 as being the foundation layer of the pixel electrode 22, and the pixel electrode 22 with a substantially-uniform thickness by following the surface shape of the planarizing film 21 is provided on the planarizing film 21. Specifically, the planarizing film 21 has the concavo-convex structure whose surface is formed by alternately aligning a concave face 21a and a convex face 21b along the direction parallel to the substrate surface. On the surface of the pixel electrode 22, the concavo-convex structure including a concave face 22a corresponding to the concave face 21a of the planarizing film 21, and a convex face 22b corresponding to the convex face 21b of the planarizing film 21 is formed. In addition, the planarizing film 21 is constituted of the organic insulating film which is the same as that of the planarizing film 12 of the above-described embodiment. However, instead of the planarizing film 21, for example, the inorganic insulating film such as the silicon oxide film, the silicon nitride film, and the silicon oxide nitride film may be provided.

Figure 18A:
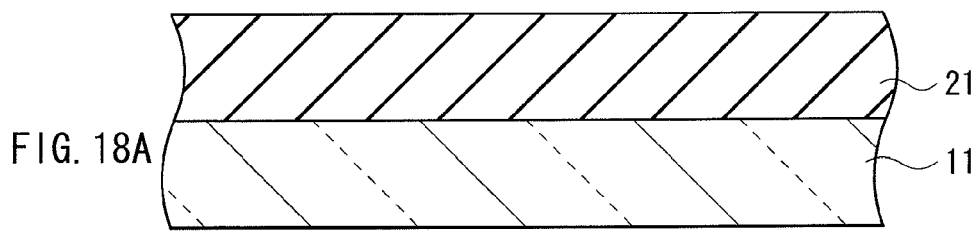
FIGS. 18A to 18C are cross-sectional views for explaining a formation process of the pixel electrode illustrated in FIG. 17.
Figure 18B:
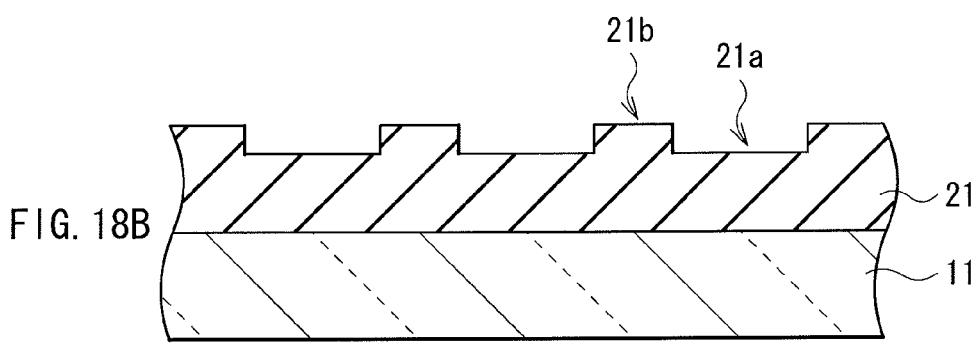
Figure 18C:
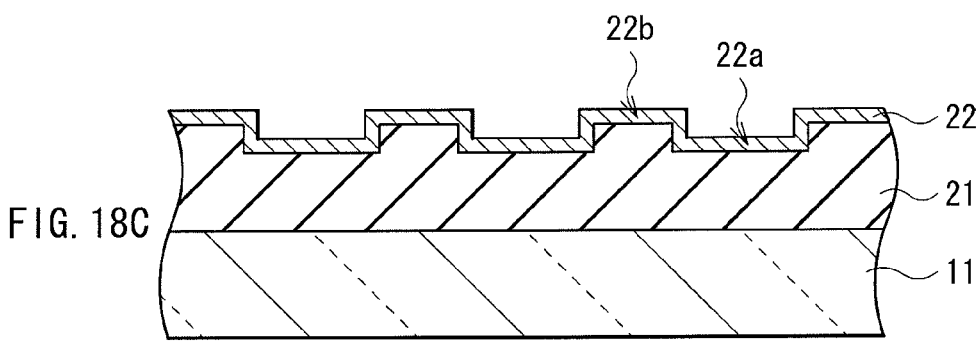

The concavo-convex structure of the pixel electrode 22 may be formed, for example, as will be described next. That is, first, as illustrated in FIG. 18A, the planarizing film 21 is, for example, formed on the drive substrate 11 by the same method as in the above-described embodiment. Next, as illustrated in FIG. 18B, a selective region (a region corresponding to the concave face 21a) of the planarizing film 21 is, for example, etched by a predetermined depth, and the concave face 21a and the convex face 21b are thus formed on the surface of the planarizing film 21. After this, as illustrated in FIG. 18C, the pixel electrode 22 is formed to cover the concavo-convex structure of the planarizing film 21, for example, by the evaporation method, the sputtering method, or the like, and the pixel electrode 22 illustrated in FIG. 17 is thus formed.

Also in this modification, like the above-described embodiment, because the concavo-convex structure including the concave face 22a and the convex face 22b is formed on the face on the liquid crystal layer 15 side of the pixel electrode 22, the electric field distortion, which is effective for providing the pre-tilt to the liquid crystal layer 15, is generated when the voltage is applied. Meanwhile, there is no notched portion in the electrode, such as the slit, in the pixel electrode 22 as a whole, so it is possible to suppress the reduction of the transmittance in the local region of the liquid crystal layer 15. Thus, it is possible to obtain the same effects as in the above-described embodiment.

3. Modification 2

Figure 19A:
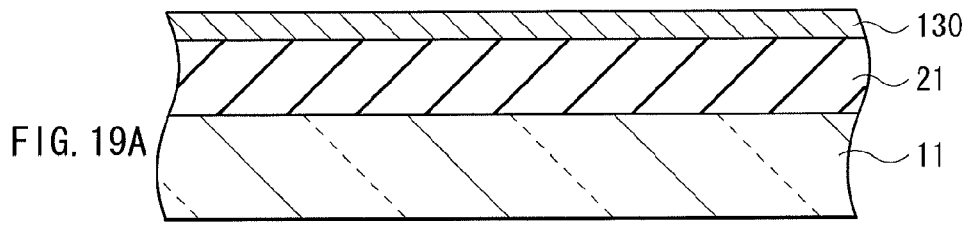
FIGS. 19A to 19C are cross-sectional views for explaining the formation process of the pixel electrode according to Modification 2.
Figure 19B:
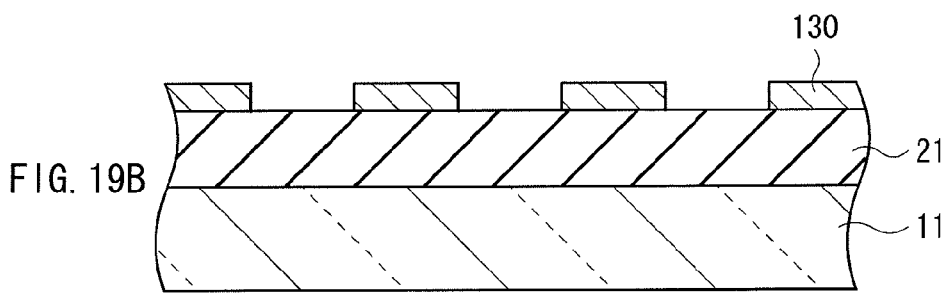
Figure 19C:
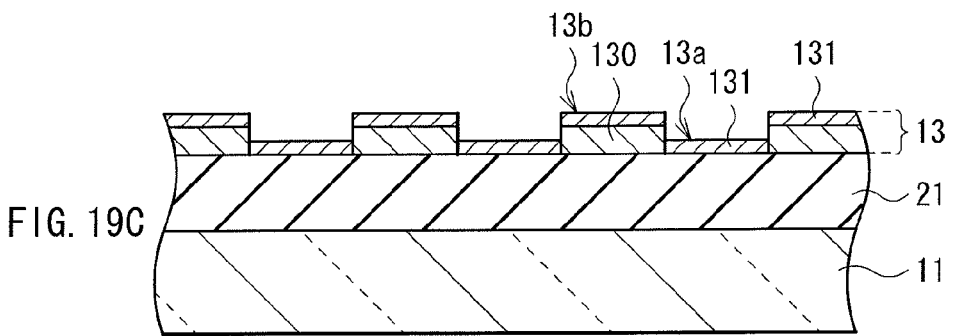

FIGS. 19A to 19C illustrates another manufacturing method of the pixel electrode 13 in the liquid crystal display according to Modification 2 in a process order. In the above-described embodiment, after the pixel electrode 13 is formed over the whole surface of the planarizing film 12, the concavo-convex structure of the pixel electrode 13 is formed by half-etching, but it is also possible to form the concavo-convex structure as will be described next. That is, as illustrated in FIG. 19A, after the planarizing film 21 is formed on the drive substrate 11, an electrode layer 130 of ITO is formed over the whole surface of the planarizing film 21 by, for example, the evaporation method or the sputtering. Next, as illustrated in FIG. 19B, the selective region (the region corresponding to the concave face 13a) of the electrode layer 130 is, for example, removed by etching using the photolithography. After this, as illustrated in FIG. 19C, an electrode layer 131 of ITO is formed by, for example, the evaporation method or the sputtering method. Thereby, the surface of the exposed planarizing film 21 is covered with the electrode layer 131, and the concavo-convex structure including the concave face 13a and the convex face 13b is formed.

In this manner, the concavo-convex structure of the pixel electrode 13 is not limited to that described in the above-described embodiment, and may be formed by various methods. That is, if the face on the liquid crystal layer 15 side of the pixel electrode 13 has the concavo-convex structure, it is possible to obtain the same effects as the above-described embodiment.

4. Modification 3

Figure 20:
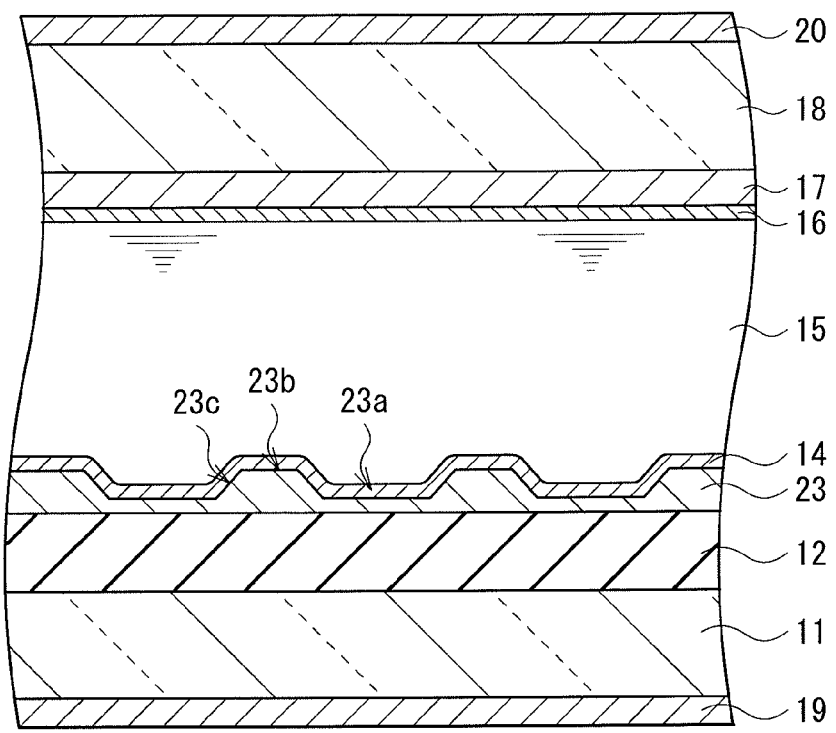
FIG. 20 is a cross-sectional view illustrating the partial region of the pixel in the liquid crystal display panel according to Modification 3.

FIG. 20 illustrates the cross-sectional structure (corresponding to part of the pixel) of the liquid crystal display panel in the liquid crystal display according to Modification 3. Like the liquid crystal display panel 2 of the above-described embodiment, in the liquid crystal display panel of this modification, the liquid crystal layer 15 is sandwiched between the drive substrate 11 and the facing substrate 18, and the polarizing plates 19 and 20 are bonded the onto outer faces of the drive substrate 11 and the facing substrate 18, respectively. A pixel electrode 23 is disposed for each pixel 10 above the drive substrate 11 with the planarizing film 12 in between. In such a structure, also in this modification, the face on the liquid crystal layer 15 side of the pixel electrode 23 has the concave convex structure, and the face on the liquid crystal layer 15 side of the opposite electrode 17 is flat.

However, in this modification, the concavo-convex structure of the pixel electrode 23 has a taper. Specifically, the concavo-convex structure includes a concave face 23a and a convex face 23b alternately aligned along the direction parallel to the substrate surface, and a step portion between the concave face 23a and the convex face 23b is a taper face 23c. A taper angle (the direction vertical to the substrate surface is 0°) of the taper face 23 is, for example, 0° to 80° both inclusive. That is, in this modification, the concavo-convex structure in which a convex portion whose cross-sectional shape is a trapezoid is aligned at a predetermined interval on the surface of the pixel electrode 23 is formed.

The concavo-convex structure of the pixel electrode 23 may be, for example, formed by etching by using the photolithography.

Like the above-described embodiment, also in this modification, because the concavo-convex structure including the concave face 23a and the convex face 23b is formed on the face on the liquid crystal layer 15 side of the pixel electrode 23, the electric field distortion, which is effective for providing the pre-tilt to the liquid crystal layer 15, is generated when the voltage is applied thereto. Meanwhile, in the pixel electrode 23 as a whole, there is no notched portion of the electrode, such as the slit, so it is possible to suppress the reduction of the transmittance in the local region of the liquid crystal layer 15. Therefore, it is possible to obtain the same effects as the above-described embodiment.

Figure 21:
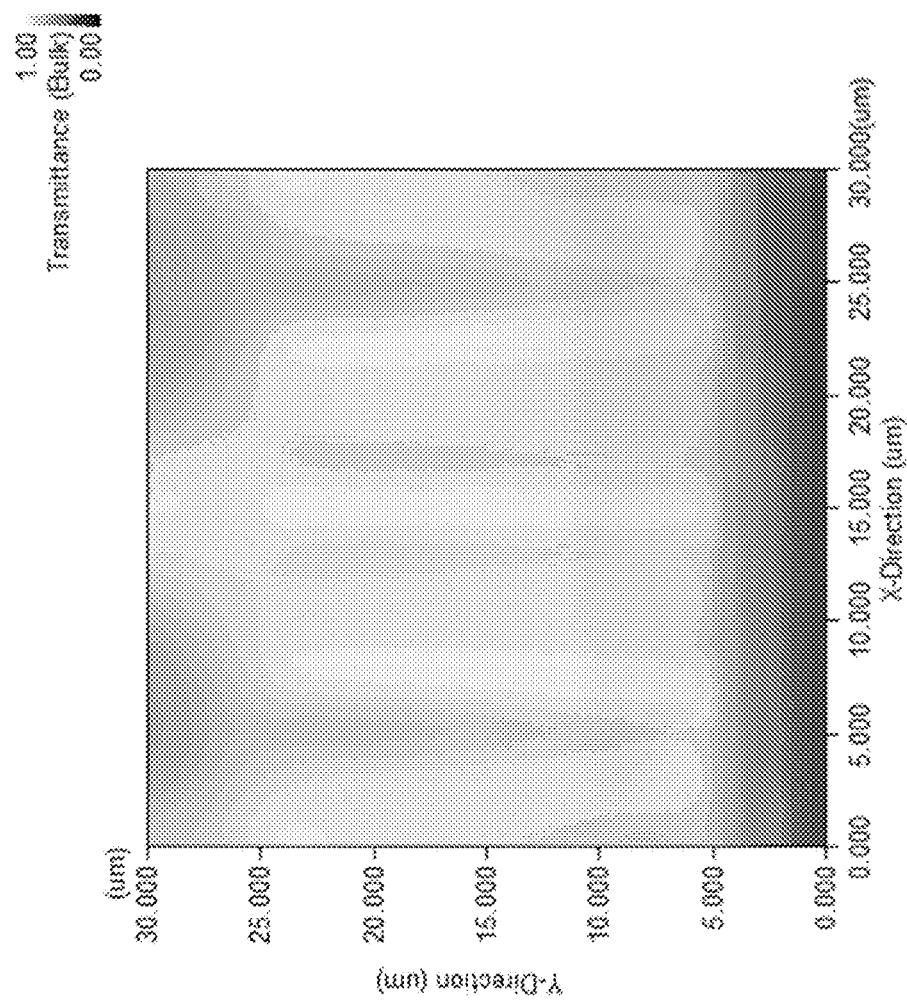
FIG. 21 is a plan view illustrating the measurement results of the transmittance distribution of the liquid crystal display panel illustrated in FIG. 20.

Here, simulation results of the transmittance distribution are illustrated in FIG. 21. In addition, the conditions such as the dimension of the pixel electrode 13, the concavo-convex structure, the thickness of the liquid crystal layer 15, the application voltage, the wavelength of the incident light are the same as those in the simulation (FIG. 16A) of the above-described embodiment. However, the taper angle is tilted at 30° from the direction vertical to the substrate surface. In this manner, like the above-described embodiment, by providing the concavo-convex structure including the taper face in the step portion, it can be seen that the dark lines are reduced, the transmittance is improved, and the uniform transmittance distribution is easily realized.

5. Modification 4

Figure 22:
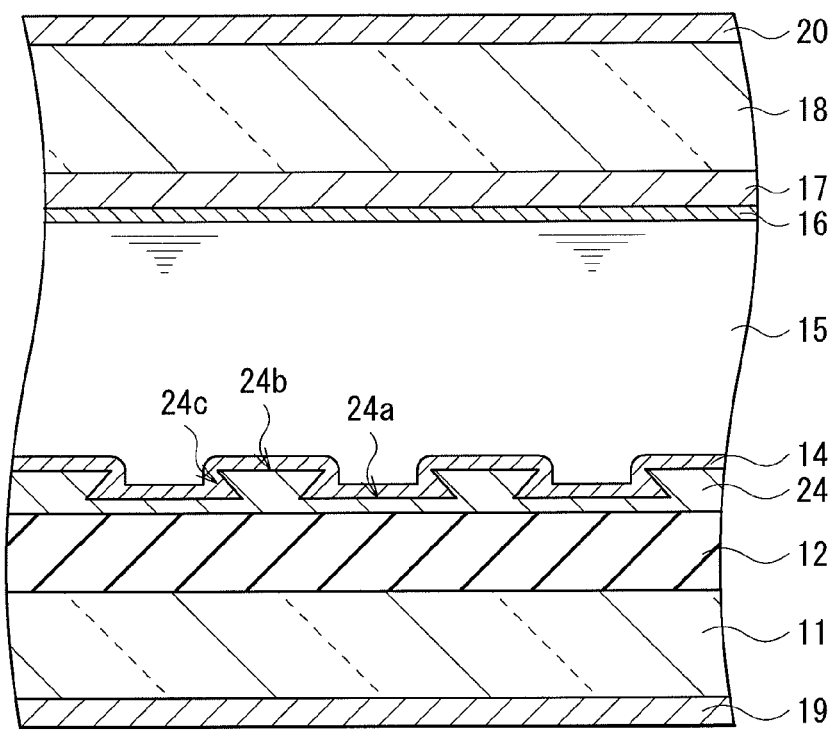
FIG. 22 is a cross-sectional view illustrating the partial region of the pixel in the liquid crystal display panel according to Modification 4.

FIG. 22 illustrates the cross-sectional structure (corresponding to part of the pixel) of the liquid crystal display panel in the liquid crystal display according to Modification 4. Like the liquid crystal display panel 2 of the above-described embodiment, in the liquid crystal display panel of this modification, the liquid crystal layer 15 is sandwiched between the drive substrate 11 and the facing substrate 18, and the polarizing plates 19 and 20 are bonded onto the outer faces of the drive substrate 11 and the facing substrate 18, respectively. A pixel electrode 24 is disposed for each pixel 10 above the drive substrate 11 with the planarizing film 12 in between. In such a structure, also in this modification, the face on the liquid crystal layer 15 side of the pixel electrode 24 has the concave convex structure, and the face on the liquid crystal layer 15 side of the opposite electrode 17 is flat.

However, in this modification, the concavo-convex structure of the pixel electrode 24 has a reverse taper. Specifically, the concavo-convex structure includes a concave face 24a and a convex face 24b alternately aligned along the direction parallel to the substrate surface, and the step portion between the concave face 24a and the convex face 24b is a reverse taper face 24c. That is, in this modification, the concavo-convex structure in which the convex portion whose cross-sectional shape is a reverse trapezoid is aligned at a predetermined interval is formed on the surface of the pixel electrode 24.

The concavo-convex structure of the pixel electrode 24 may be, for example, formed by etching using the photolithography.

Like the above-described embodiment, also in this modification, because the concavo-convex structure including the concave face 24a and the convex face 24b is formed on the face on the liquid crystal layer 15 side of the pixel electrode 24, the electric field distortion, which is effective for providing the pre-tilt to the liquid crystal layer 15, is generated when the voltage is applied thereto. Meanwhile, in the pixel electrode 24 as a whole, there is no notched portion of the electrode, such as the slit, so it is possible to suppress the reduction of the transmittance in the local region of the liquid crystal layer 15. Therefore, it is possible to obtain the same effects as the above-described embodiment. Further, because the step portion is the reverse taper face, it is possible to generate the electric field distortion with the step smaller than the step with a vertical face. Thus, it is possible to control the alignment without an increase of the thickness of the whole pixel electrode.

Next, the detailed structure in the case where the foundation layer of the pixel electrode has the concavo-convex structure as described in Modification 1 will be described with the following Modification 5-1 to Modification 5-5.

6. Modifications 5-1 to 5-5

Modification 5-1

Figure 23:
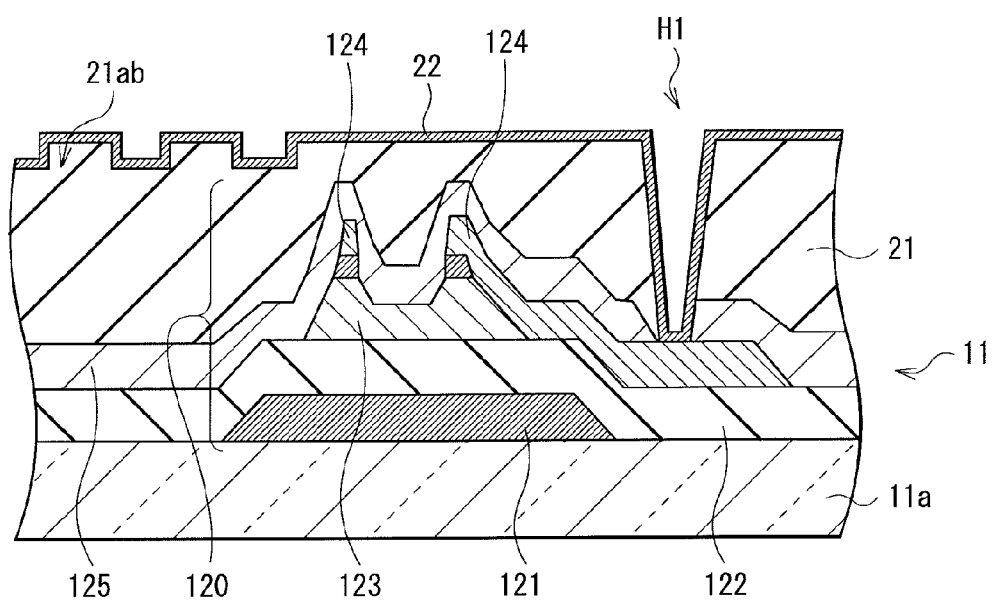
FIG. 23 is a cross-sectional view for explaining a concavo-convex structure according to Modification 5-1.

FIG. 23 is a cross-sectional view for explaining an example of the concavo-convex structure according to Modification 5-1. This modification is an example of the detailed structure of the case in which there is the concavo-convex structure which is the same as that of Modification 1 described above (the case in which a concavo-convex structure 21ab is provided on the surface of the planarizing film 21 as being the foundation layer of the pixel electrode 22). As illustrated in FIG. 23, the planarizing film 21 is provided to cover a transistor 120 (TFT), a wiring which is not illustrated in the figure, or the like on a substrate 11a. The transistor 120 includes, for example, a semiconductor layer 123 above a gate electrode 121 with a gate insulating film 122 in between. A source/drain electrode 124 is disposed on the semiconductor layer 123, and the semiconductor layer 123 and the source/drain electrode 124 are covered with a protective film 125. In addition, the transistor 120 is not limited to such a bottom-gate type, but may be a top-gate type.

The planarizing film 21 is provided with a contact hole H1 ensuring electrical conduction between the transistor 120 (the source/drain electrode 124) and the pixel electrode 22. On the planarizing film 21, the pixel electrode 22 buries the bottom of the contact hole H1, and is formed with a substantially-uniform thickness by following the surface shape of the concavo-convex structure 21ab.

The concavo-convex structure 21ab in the planarizing film 21 may be, for example, formed as will be described next. That is, although it is omitted in the figure, first, after the planarizing film 21 is formed on the drive substrate 11 by the above-described method, the concavo-convex structure 21ab and the contact hole H1 are formed on the surface of the planarizing film 21 by using the photolithography. Specifically, first, a photoresist is applied onto the planarizing film 21, and the exposure and the development are performed on the photoresist by using a predetermined photomask to pattern the photoresist. At this time, as the photomask, a mask including a transmission region (transmittance is approximately 100%) corresponding to the contact hole H1, and including a semi-transmission region (transmittance is several % to several tens of %) corresponding to the formation region of the concavo-convex structure 21ab is used. The region corresponding to the concavo-convex structure 21ab is a so-called half-tone mask. After that, the etching is performed to remove the photoresist, and the contact hole H1 penetrating to the surface of the source/drain electrode 124 is thus formed in a partial region of the planarizing film 21. Meanwhile, in a selective region other than the partial region, the predetermined concavo-convex structure 21ab is formed on the surface of the selective region. The depth of the concave (the height of the convex) and the width of the concave (the width of the convex) in the concavo-convex structure 21ab may be adjusted by the transmittance and the pattern of the semi-transmission region in the above-described photomask. After this, the pixel electrode 22 may be formed on the planarizing film 21.

Like this modification, in the case where the concavo-convex structure 21ab is provided in the foundation layer (the planarizing film 21) of the pixel electrode 22, it is possible to form the concavo-convex structure 21ab and the contact hole H1 at the same time by using the photolithography utilizing the half-tone mask. That is, it is possible to form the concavo-convex structure 21ab in the planarizing film 21 without newly increasing a manufacturing step.

Modification 5-2

Figure 24A:
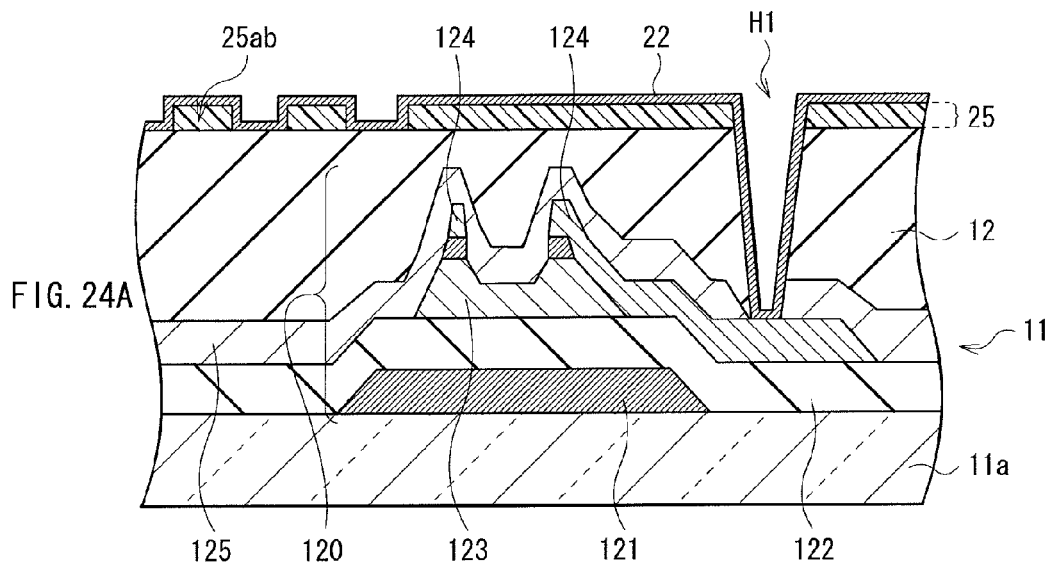
FIGS. 24A and 24B are cross-sectional views for explaining the concavo-convex structure according to Modification 5-2.

FIG. 24A is a cross-sectional view for explaining an example of the concavo-convex structure according to Modification 5-2. Like Modification 5-1 described above, in this modification, the foundation layer of the pixel electrode 22 includes the concavo-convex structure, but this modification is different from Modification 5-1 on the next point. That is, in this modification, the surface of the planarizing film 12 is flat, and a photoresist 25 constituting a concavo-convex structure 25ab is provided on the planarizing film 12. Like Modification 5-1, the planarizing film 12 is provided with the contact hole H1 ensuring the electrical conduction between the pixel electrode 22 and the source/drain electrode 124. The photoresist 25 includes an aperture in the region corresponding to the contact hole H1, and is patterned in the region other than the region corresponding to the contact hole H1 to form the concavo-convex 25ab. On the photoresist 25, the pixel electrode 22 buries the bottom of the contact hole H1, and is formed with a substantially uniform thickness by following the shape of the concavo-convex structure 25ab.

The concavo-convex structure 25ab by using the photoresist 25 may be, for example, formed as will be described next. That is, although it is omitted in the figure, first, after the planarizing film 12 is formed on the drive substrate 11 by the above-described method, the contact hole H1 is formed by using the photolithography. Next, the photoresist 25 is applied onto the planarizing film 12, the exposure and the development are performed on the photoresist 25, and the patterning is performed on the photoresist 25 so that the surface of the source/drain electrode 124 is exposed in the contact hole H1, and the surface of the planarizing film 12 is exposed in the formation region of the concavo-convex structure 25ab. Thereby, the concavo-convex structure 25ab using the photoresist 25 is formed on the planarizing film 12.

Figure 24B:
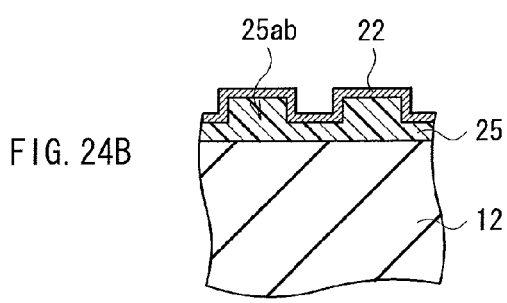

In the case where the foundation layer of the pixel electrode 22 is provided with the concavo-convex structure, the concavo-convex structure 21ab may be provided in the planarizing film 21 itself as described in Modification 5-1, or the concavo-convex structure 25ab may be formed by utilizing the photoresist 25 as in this modification. Thereby, it is possible to form the concavo-convex structure 25ab without the etching process. In this modification, the depth of the concave (the height of the convex) and the width of the concave (the width of the convex) in the concavo-convex structure 25ab may be adjusted by changing the film thickness and the pattern of the photoresist 25. Here, in the concavo-convex structure 25ab, the selective region of the photoresist 25 is removed until the surface of the planarizing film 12 (part of the surface of the planarizing film 12 is in contact with the pixel electrode), but the photoresist 25 is not necessarily completely removed until the surface of the planarizing film 12. That is, as illustrated in FIG. 24B, the concavo-convex structure 25ab may be provided at least in part on the pixel electrode 22 side of the photoresist 25, and the face on the planarizing film 12 side may be flat.

Modification 5-3

Figure 25:
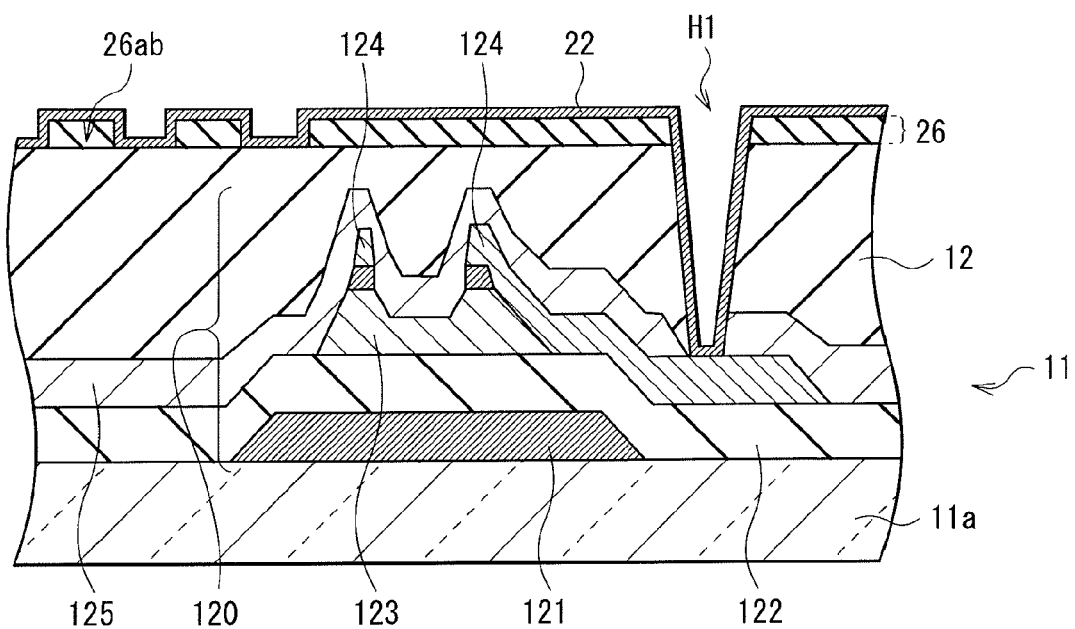
FIG. 25 is a cross-sectional view for explaining the concavo-convex structure according to Modification 5-3.

FIG. 25 is a cross-sectional view for explaining an example of the concavo-convex structure according to Modification 5-3. Like Modification 5-1 and Modification 5-2, in this modification, the foundation layer of the pixel electrode 22 includes the concavo-convex structure. Like Modification 5-2, the surface of the planarizing film 12 is flat, and the concavo-convex structure is separately provided on the planarizing film 12. However, in this modification, an inorganic insulating film 26 is provided on the planarizing film 12, and a concavo-convex structure 26ab is formed in the inorganic insulating film 26. The inorganic insulating film 26 is, for example, constituted of the silicon oxide film, the silicon nitride film, the silicon oxide nitride film, or the like, and patterned in the region corresponding to the contact hole H1, and the region constituting the concavo-convex structure 26ab. On the inorganic insulating film 26, the pixel electrode 22 buries the bottom of the contact hole H1, and is formed with a substantially uniform thickness by following the shape of the concavo-convex structure 26ab.

The concavo-convex structure 26ab by using the inorganic insulating film 26 may be, for example, formed as will be described next. That is, although it is omitted in the figure, first, after the planarizing film 12 is formed on the drive substrate 11 by the above-described method, the contact hole H1 is formed by using the photolithography. Next, after the inorganic insulating film 26 is, for example, formed on the planarizing film 12 by the CVD method, the inorganic insulating film 26 is etched by the photolithography in the region corresponding to the contact hole H1, and in the formation region of the concavo-convex structure 26ab. Thereby, the concavo-convex structure 26ab by using the inorganic insulating film 26 is formed on the planarizing film 12.

Like this modification, in the case where the concavo-convex structure is provided in the foundation layer of the pixel electrode 22, the concavo-convex structure 26ab may be formed by utilizing the inorganic insulating film 26 provided on the planarizing film 12. By using the inorganic insulating film 26, a desired concavo-convex shape is easily formed in the concavo-convex structure 26ab, and formation stability is enhanced. In addition, like the photoresist 25 of Modification 5-2, the inorganic insulating film 26 is not necessarily completely removed until the surface of the planarizing film 12 in the concavo-convex structure 26ab. The concavo-convex structure 26ab may be provided at least only in part on the pixel electrode 22 side. Further, an organic insulating film may be used without being limited to the inorganic insulating film.

Modification 5-4

Figure 26:
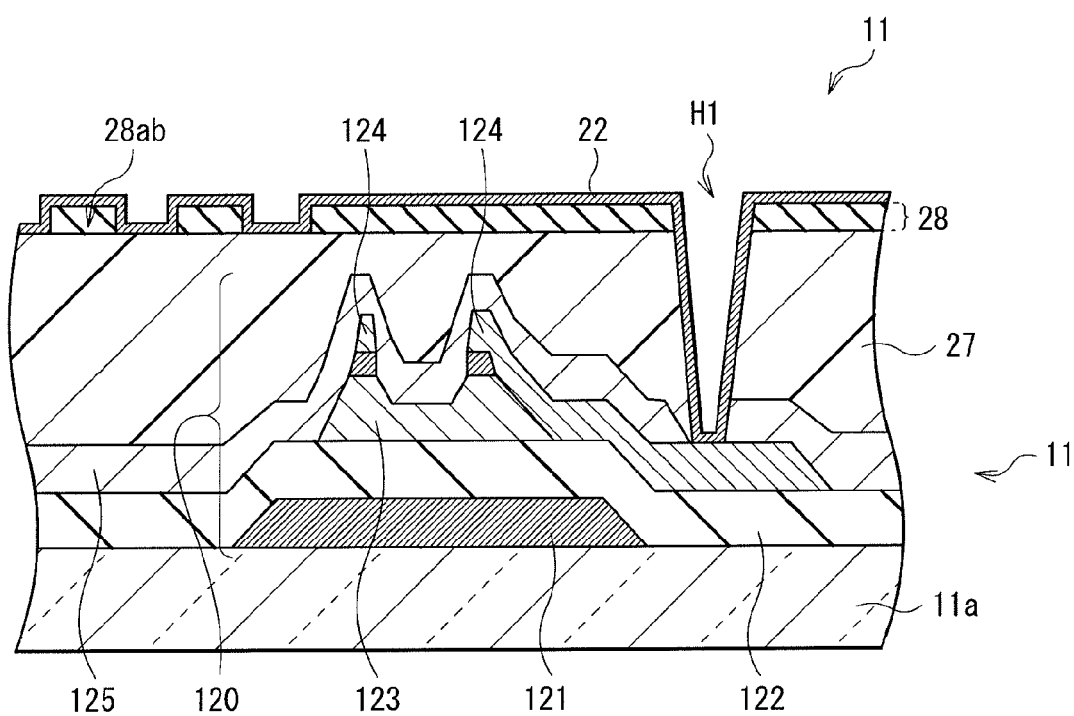
FIG. 26 is a cross-sectional view for explaining the concavo-convex structure according to Modification 5-4.

FIG. 26 is a cross-sectional view for explaining an example of the concavo-convex structure according to Modification 5-4. Like Modification 5-1 to Modification 5-3, in this modification, the foundation layer of the pixel electrode 22 includes the concavo-convex structure. However, unlike Modification 5-1 to Modification 5-3, this modification is an application example of the present invention to a COA structure including a color filter layer 27 on the drive substrate 11. In this modification, the color filter layer 27 is formed to cover the transistor 120 provided on the drive substrate 11. An insulating film 28 as a protective layer of the color filter 27 is provided on the color filter layer 27, and the insulating film 28 includes a concavo-convex structure 28ab. The color filter layer 27 contains, for example, a resin material, a pigment, and a dye, and is colored with one color of R, Q and B for each pixel. The insulating film 28 is, for example, constituted of an organic film of a thermoset resin, a photoreactive resin, or the like, or an inorganic film of the silicon oxide film, the silicon nitride film, the silicon oxide nitride film, or the like, and is patterned in the region corresponding to the contact hole H1, and the region constituting the concavo-convex structure 28ab. On the insulating film 28, the pixel electrode 22 buries the bottom of the contact hole H1, and is formed with a substantially uniform thickness by following the shape of the concavo-convex structure 28ab.

The concavo-convex structure 28ab using the insulating film 28 may be, for example, formed as will be described next. That is, although it is omitted in the figure, first, after the color filter layer 27 is formed on the drive substrate 11, for example, the insulating film 28 of the organic film is applied onto the color filter layer 27. After this, the contact hole H1 is formed by using the photolithography, and the concavo-convex structure 28ab is formed. Thereby, the concavo-convex structure 28ab using the insulating film 28 is formed on the color filter layer 27. In addition, the insulating film 28 is patterned to form the concavo-convex structure 28ab, and part of the surface of the color filter layer 27 is thus exposed from the insulating film 28 as being the protective film. However, the exposed face of the color filter is finally covered with the pixel electrode 22. That is, the pixel electrode 22 (for example, ITO) functions as the protective film, so the color filter layer 27 is not easily deteriorated due to formation of the concavo-convex structure 28ab.

In the case where the foundation layer of the pixel electrode 22 is provided with the concavo-convex structure, the present invention is also applicable to the COA structure as in this modification. In this case, the concavo-convex structure 28ab may be formed in the insulating film 28 provided on the color filter layer 27. Further, like Modification 5-2, the insulating film 28 is not necessarily removed until the surface of the color filter layer 27 in the concavo-convex structure 28ab. The concavo-convex structure 28ab may be provided at least only in part on the pixel electrode 22 side of the insulating film 28.

In the case where the inorganic film is used as the insulating film 28, after the color filter layer 27 is formed on the drive substrate 11, the contact hole H1 is formed in the color filter layer 27. Next, the inorganic film as described above is formed on the color filter layer 27 by, for example, the CVD method, and the inorganic film is patterned to form the concavo-convex structure 28ab.

Modification 5-5

Figure 27:
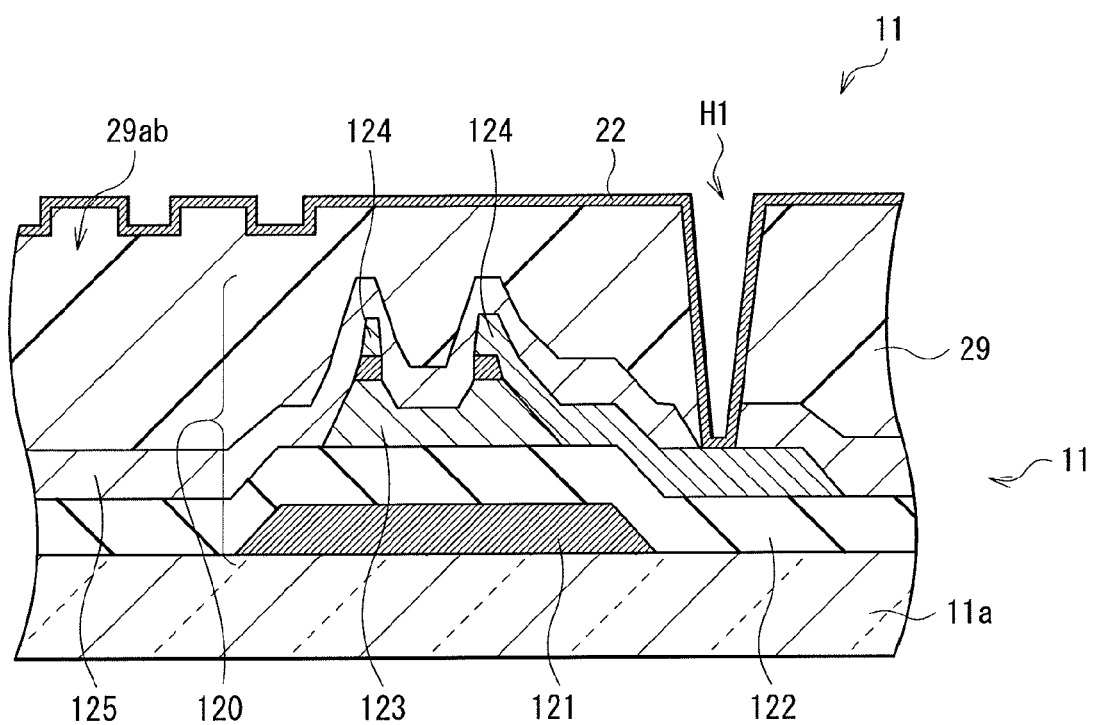
FIG. 27 is a cross-sectional view for explaining the concavo-convex structure according to Modification 5-5.

As illustrated in FIG. 27, in the COA structure as described in Modification 5-4, a concavo-convex structure 29ab may be formed directly on the surface of a color filter layer 29. In this case, it is possible to collectively form the concavo-convex structure 29ab and the contact hole H1 in the same step by utilizing the predetermined photomask described in Modification 5-1. Further, in this modification, the whole surface of the color filter layer 29 is covered with the pixel electrode 22, and the pixel electrode 22 functions as the protective film of the color filter layer 29. In this manner, the concavo-convex structure 29ab may be provided in the color filter layer 29 itself In Modification 5-1 to Modification 5-5, although the case in which the concavo-convex structure is provided in the foundation layer of the pixel electrode 22 has been described, the present invention is also applicable to the case in which the concavo-convex pattern is formed on the opposite electrode 17 side. For example, in the case where the color filter layer is provided on the facing substrate 18 side, the concavo-convex structure is formed on the surface of the color filter layer, or on the surface of the protective film of the color filter layer, and the opposite electrode 17 may be formed to cover the formed concavo-convex structure.

7. Modification 6

Figure 28A:
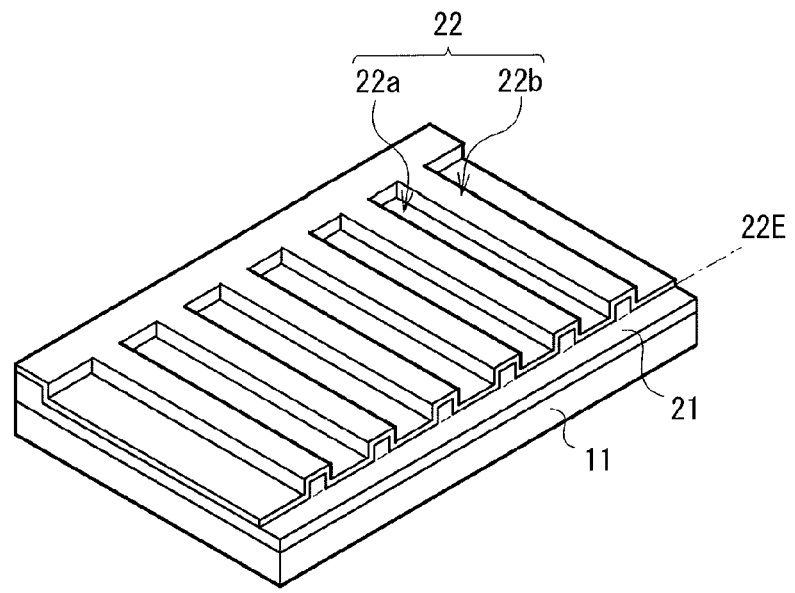
FIGS. 28A and 28B are a perspective view and a plan view for explaining the pixel electrode (the structure of an end portion of the electrode) according to Modification 6.
Figure 28B:
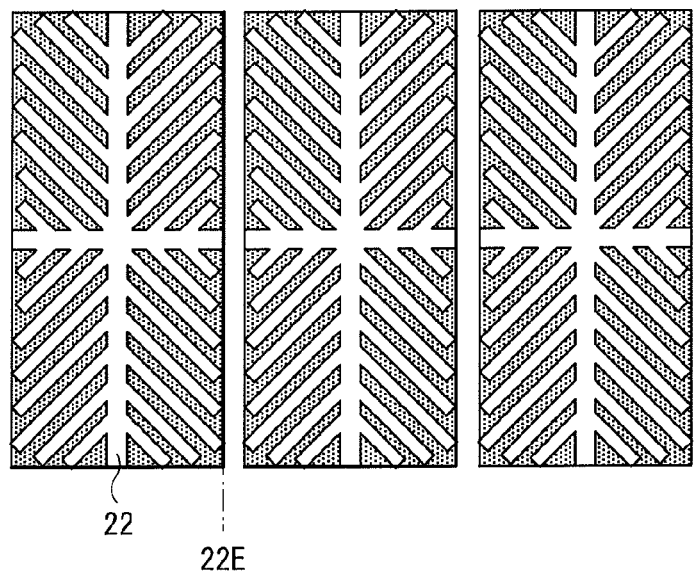

FIGS. 28A and 28B are schematic views for explaining the structure of an end portion of the pixel electrode, FIG. 28A illustrates the perspective structure thereof, and FIG. 28B illustrates the pixel electrode 22 provided above the drive substrate 11 with the planarizing film 21 in between, as viewed from the pixel electrode 22 side. In the pixel electrode described in the embodiment and the modifications, its end portion (specifically, a non-display area facing a black matrix layer) may be removed. Hereinafter, as the pixel electrode, the pixel electrode (the pixel electrode 22) provided on the foundation layer including the concavo-convex structure which has been described in Modification 5-1 to Modification 5-5 will be exemplified. Specifically, after the pixel electrode 22 is formed on the foundation layer such as the planarizing film including the concavo-convex structure, the pixel electrode 22 including such an electrode end 22E (a periphery region) is completed by etching and removal of its end portion.

In this manner, because the pixel electrode 22 includes the patterned electrode end 22E, the oblique electric field is strong, and the liquid crystal is easily aligned in the desired direction in the pixel end portion.

Here, measurement experiments and simulations were conducted by manufacturing a sample, which will be described next, in which the pixel electrode 22 including the electrode end 22E was formed on the planarizing film 21 of Modification 5-1. That is, first, the thermoset resin (SS3969 manufactured by JSR Co., Ltd.) was applied onto the glass substrate by the spin coat method, and was prebaked (at 90° C. for 90 seconds) by using the hot plate. After that, the thermoset resin was baked for 1 hour in an oven set at 230° C. to form the planarizing film 21 with a film thickness of 2 μm. Stripe-shaped concaves (grooves) each with a width of 4 μm (a width of the convex is also 4 μm) and a depth of 100 nm were pattern-formed by the photolithography on the surface of the planarizing film 21, the ITO with a thickness of 100 nm was formed over the whole surface, and then only the end portion was removed by etching using the photolithography. The alignment film (an FPA material manufactured by JSR Co., Ltd.) is applied onto the surface of the formed pixel electrode 22 and the surface of the electrode of the separately-prepared facing substrate (the substrate on which the solid opposite electrode without being patterned is formed). Next, the liquid crystal material (MLC-7026 manufactured by Merck & Co., Inc.) was sealed between the pixel electrode 22 and the opposite electrode. After that, the UV exposure was performed on the liquid crystal while the voltage is supplied to the liquid crystal through the pixel electrode 22 and the opposite electrode, and the pre-tilt was thereby provided to the liquid crystal molecule in the vicinity of the alignment film. The transmittance, the tilt angle, and the response characteristics of the sample manufactured in this manner (a sample A: groove depth 100 nm) were measured. Further, the transmittance, the tilt angle, and the response characteristics of a sample B (groove depth 200 nm) and a sample C (groove depth 300 nm) manufactured in the same conditions as those described above except the depth of the groove formed on the planarizing film 21 were measured in the same manner.

Figure 29:
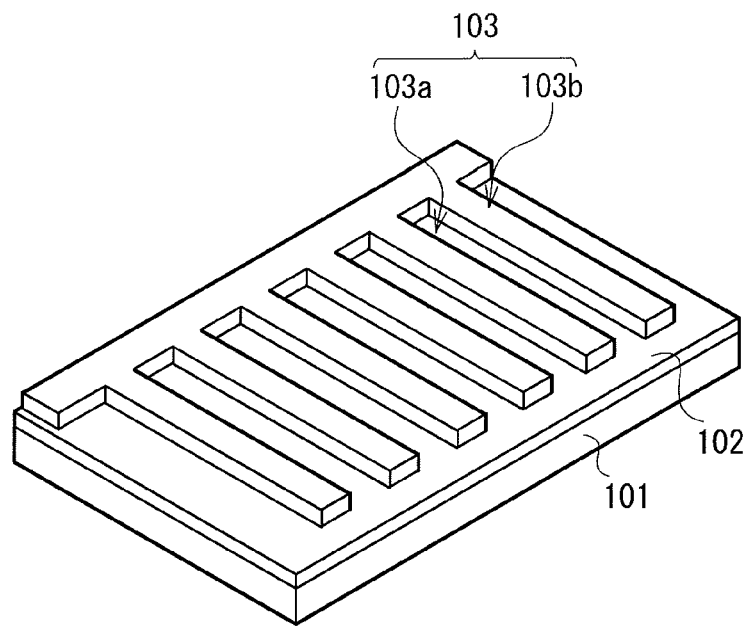
FIG. 29 is a perspective view illustrating the structure of a sample having the fine-slit structure.

As a comparative example of the samples A to C, a sample D which will be described next was manufactured, and the same measurements were performed. As the structure on the drive substrate side of the sample D, as illustrated in FIG. 29, a structure in which a planarizing film 102 was formed on the drive substrate 101, and a pixel electrode 103 having the fine-slit structure was disposed on the planarizing film 102 was used. Specifically, first, after the planarizing film 102 (without the concavo-convex structure) with a film thickness of 2 μm was formed on the glass substrate in the same manner as described above, the ITO with a thickness of 100 nm was formed over the whole surface of the planarizing film 102. After that, the formed ITO was patterned by the photolithography, and the stripe-shaped region corresponding to the slit 103a, and the end portion region were selectively removed by etching. The width of the slit 103a was the same as those of the samples A to C, and the structure on the opposite electrode side, the materials of the alignment film and the liquid crystal, the voltage application conditions, and the UV exposure conditions were the same as those of the samples A to C.

The transmittance, the tilt angle, and the response characteristics measured as described above were illustrated in FIGS. 30 to 32. The tilt angle indicates the voltage applied onto each electrode at the time of the UV exposure, and the tilt angle provided by the voltage application. As a measurement value of the tilt angle, the tilt angles of the liquid crystal molecules in a certain region were measured, and an average of those tilt angles was indicated.

Figure 30:
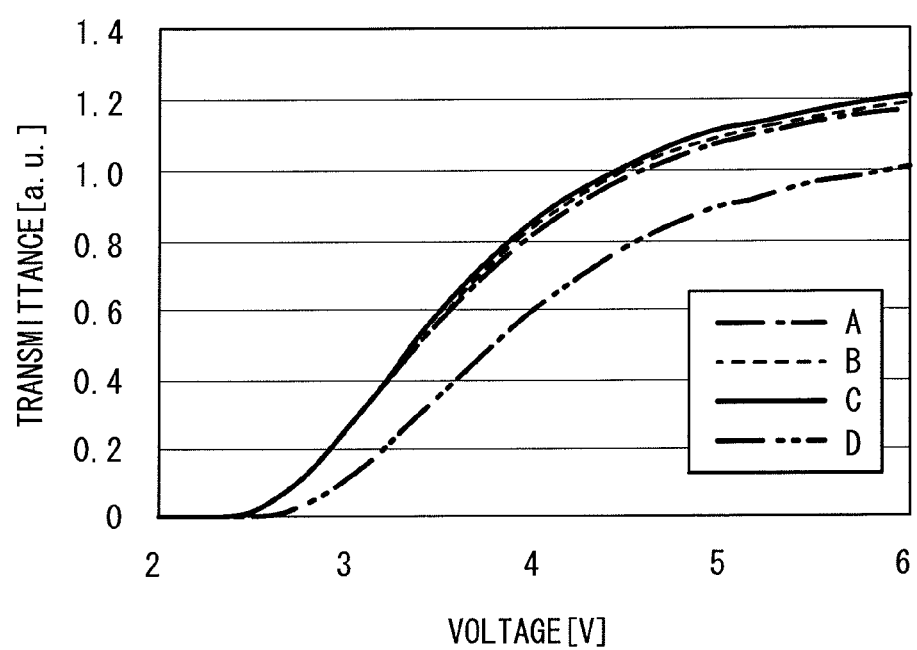
FIG. 30 is a characteristic view illustrating the relation between a voltage and the transmittance of the sample using the pixel electrode illustrated in FIGS. 28A and 28B.

As illustrated in FIG. 30, the transmittance was improved by approximately 17% in the samples A to C including the concavo-convex pattern in the pixel electrode, as compared with that of the sample D using the fine-slit structure.

Figure 31:
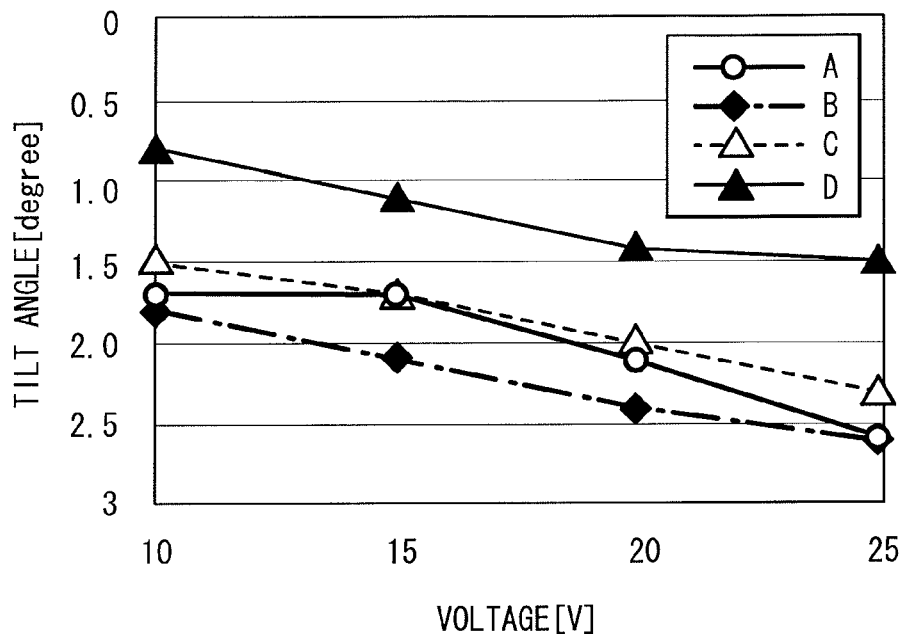
FIG. 31 is a characteristic view illustrating the relation between the voltage and the tilt angle of the sample using the pixel electrode illustrated in FIGS. 28A and 28B.

As illustrated in FIG. 31, it can be seen that the provided tilt angles in the samples A to C are larger than that of the sample D. Although detail will be described later, it is thought that this is because variation of the alignment state of the liquid crystal molecules is generated in the sample D, and the alignment states in the samples A to C are easily uniformly aligned. As described above, because the tilt angle indicates the average of the tilt angles of the liquid crystal molecules in the certain region, in the case where the tilt directions of the liquid crystal molecules are varied, and there are the liquid crystal molecules which do not tilt, the average value is likely to be a small value. Meanwhile, when the tilt directions of the liquid crystal molecules are aligned in a certain direction, the actual tilt angles of the liquid crystal molecules, and the average value are likely to be close to each other.

Figure 32:
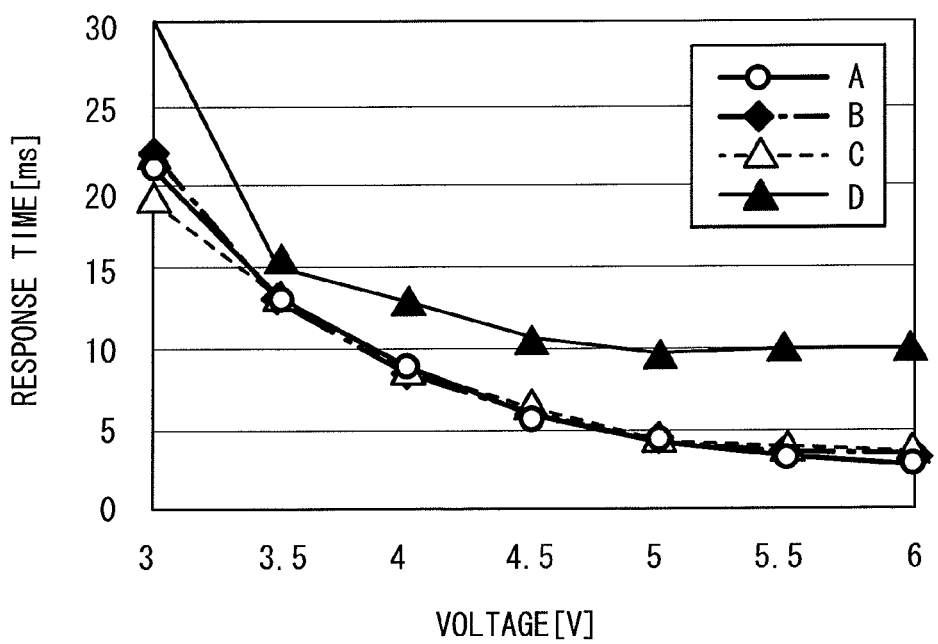
FIG. 32 is a characteristic view illustrating the relation between the voltage and the response speed of the sample using the pixel electrode illustrated in FIGS. 28A and 28B.

Further, as illustrated in FIG. 32, it can be seen that the responses to the voltage in the samples A to C are faster than that of the sample D. It is thought that this is because the liquid crystal molecules are likely to tilt in the certain direction when the directions of the pre-tilts are aligned. In the above-described results, there is substantially no difference of the response characteristics and the transmittance between the samples A to C in which the groove depths are set to 100 nm, 200 nm, and 300 nm.

As a proof of these results, simulations of the alignment of the liquid crystal molecules in the case where the voltage is changed (5V, 7.5V, and 10V) when the pre-tilt is provided are illustrated in FIGS. 33B and 33C. However, FIG. 33B illustrates the electrode having the fine-slit structure, FIG. 33C illustrates the electrode having the concavo-convex pattern, and FIGS. 33B and 33C illustrate a region S1 in the vicinity of the interface of the convex and the concave of the electrode (in the vicinity of the interface of the electrode portion and the slit portion in the fine-slit structure) illustrated in FIG. 33A. Further, in each figure, the liquid crystal molecules are schematically illustrated by using a line D1 indicating the direction of the director, and end portions D21 and D22 in the long axis direction. For example, the liquid crystal molecule illustrated with a relatively-long distance (the length of the line D1) between the end portion D21 and D22 indicates that the liquid crystal molecule tilts at a large angle in the direction along the line D1. From these simulation results, it can be seen that the liquid crystal molecule with the concavo-convex structure is provided with the pre-tilt larger than that of the liquid crystal molecule with the fine-slit structure. In the fine-slit structure, there is a large number of the liquid crystal molecules tilting in the direction orthogonal to the long side direction of the electrode, in addition to the liquid crystal molecules tilting along the long side direction of the electrode (the extending direction of the slit), and it can be seen that the tilt directions of the liquid crystal molecules are varied. On the other hand, in the case of the concavo-convex structure, it can be seen that the liquid crystal molecules tilt substantially along the long side direction of the electrode (the extending direction of the concave).

Figure 34A:
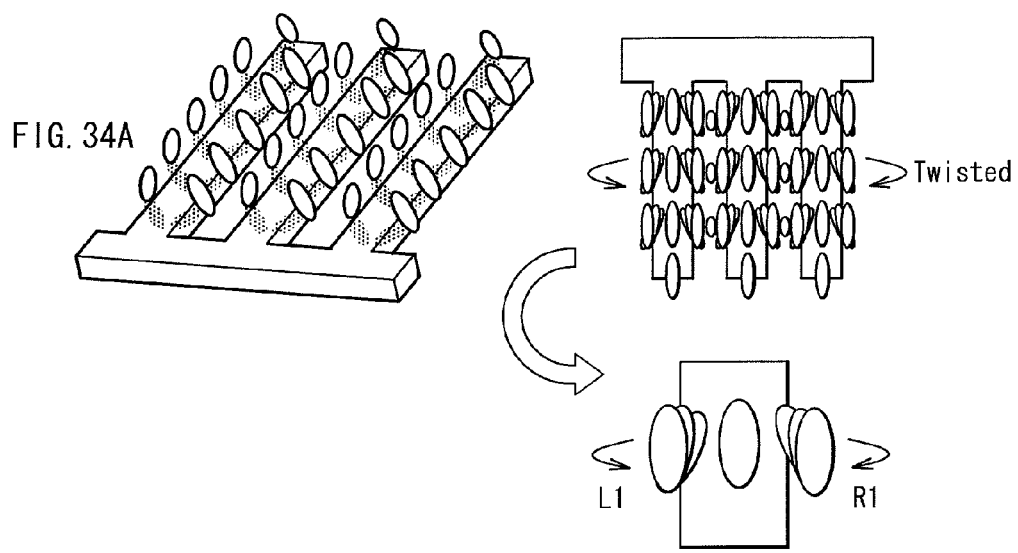
FIGS. 34A and 34B are schematic views illustrating the alignment state of the liquid crystal molecules in the vicinity of the electrode.
Figure 34B:
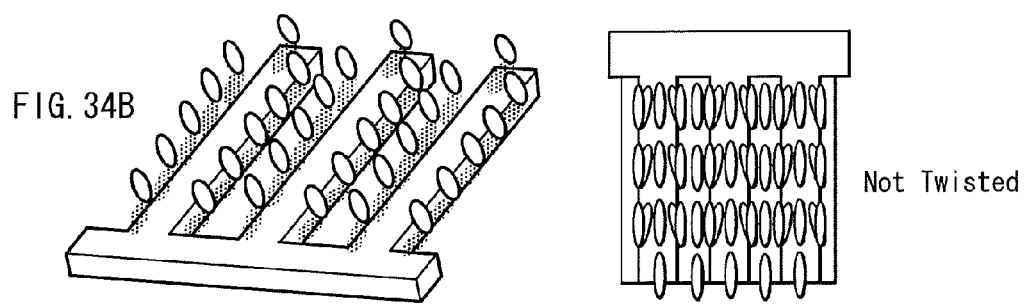

In FIGS. 34A and 34B, the alignment state of the liquid crystal molecules in the case of the fine-slit structure, and the case of the concavo-convex structure is schematically illustrated, respectively. As illustrated in FIG. 34A, in the fine-slit structure, the liquid crystal molecules are twisted (while the directors rotate from the pixel electrode to the opposite electrode) and aligned in the vicinity of the interface of the electrode portion and the slit portion. Further, because the electrode portion and the slit portion are alternately and continuously arranged, a clockwise (R1) twist and a counterclockwise (L1) twist alternately appear. FIGS. 35B to 35D illustrate the alignment state of the liquid crystal molecules with the fine-slit structures, as viewed from different angles. FIG. 35B illustrates the alignment state as viewed from arrow F1 of FIG. 35A, FIG. 35C illustrates the alignment state as viewed from arrow F2, and FIG. 35D illustrates the alignment state as viewed from arrow F3, respectively. In this manner, the tilt directions of the liquid crystal molecules are varied in the fine-slit structure, and this causes the reduction of the response speed.

On the other hand, as illustrated in FIG. 34B, the liquid crystal molecules are aligned and tilt in a substantially-uniform direction in the case of the concavo-convex structure, and it can be seen that the smooth response to the voltage is realized.

Figure 36A:
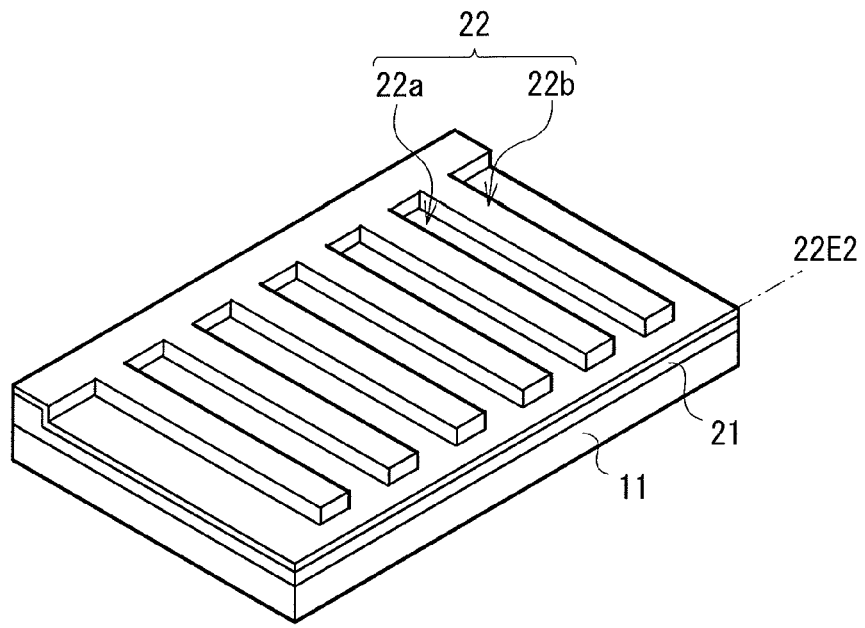
FIGS. 36A and 36B are a perspective view and a plan view for explaining another structure example of the pixel electrode illustrated in FIGS. 28A and 28B.
Figure 36B:
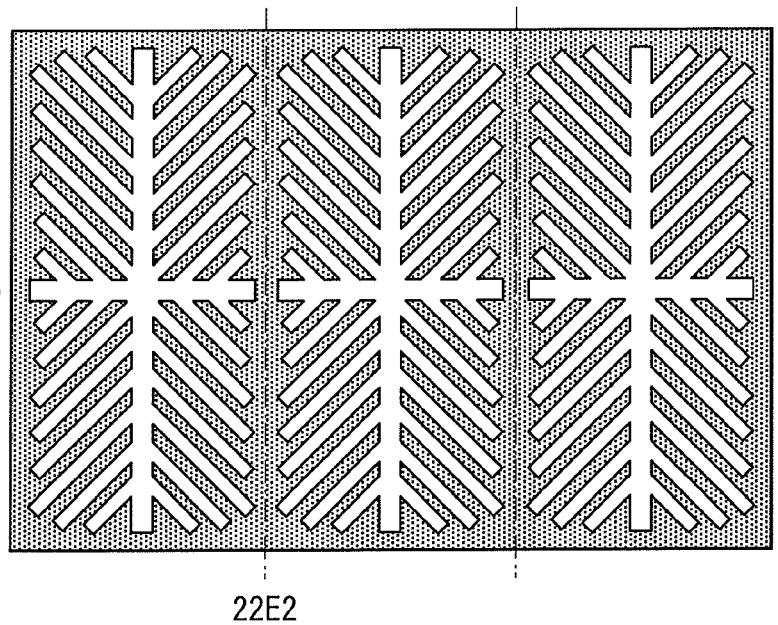

In Modification 6, although the structure in which the electrode end 22E (the periphery portion) of the pixel electrode 22 is removed by patterning has been described, it is not limited to such a structure. As illustrated in FIGS. 36A and 36B, the periphery region may not be removed.

8. Examples

Hereinafter, examples (first to third examples) of the liquid crystal displays according to the embodiment and the modifications will be described.

First example

Figure 37:
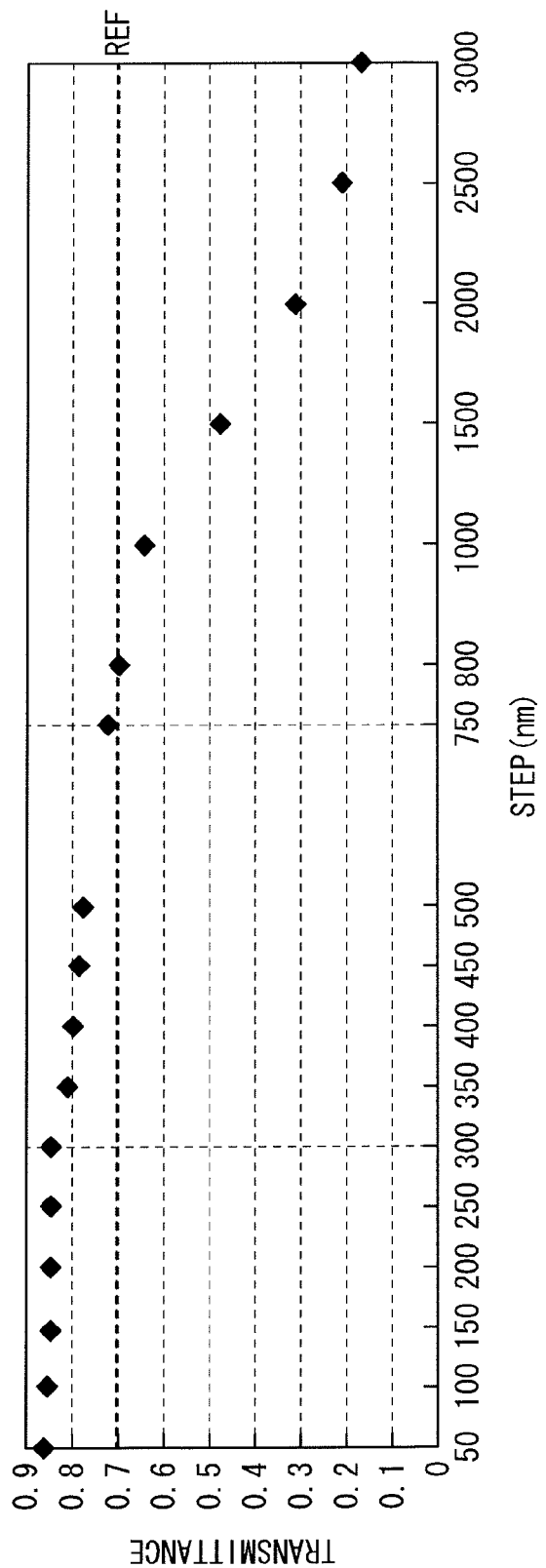
FIG. 37 is a characteristic view illustrating the relation between the height of a step (nm) and the transmittance according to a first example.

FIG. 37 illustrates measurement results of the transmittance in the case where the step height (difference between the thickness Tb of the convex face 13b and the thickness Ta of the concave face 13a) was varied in the liquid crystal display panel 2 according to the embodiment. At that time, the width S of the concave face 13a of the pixel electrode 13 of ITO was 4 µm, the width L of the convex face 13b was 4 µm, the thickness of the liquid crystal layer 15 was 3.5 µm, the application voltage was 7.5 V, and the wavelength of the incident light was 550 nm. The step height was varied by 50 nm in a range of 50 nm to 500 nm both inclusive, and varied by 500 nm in a range of 1000 nm to 3000 nm both inclusive. In a range of 500 nm to 800 nm both inclusive, measurement was performed at two points of 750 nm and 800 nm. In any of the cases, the liquid crystal was aligned without issues, but there was a tendency that the transmittance was reduced as the step height was large. Here, because the transmittance higher than the transmittance (REF=0.71) in the fine-slit structure may be realized, the step height is preferably in a range of 50 nm to 750 nm both inclusive. More preferably, it is in a range of 50 nm to 300 nm both inclusive. The tact time in the film-forming step and the etching step may be reduced, and because the step height is reduced, the structure is close to that of the solid electrode whose surface shape is flat. Thus, the improvement of the transmittance is expected.

Second example

Figure 38:
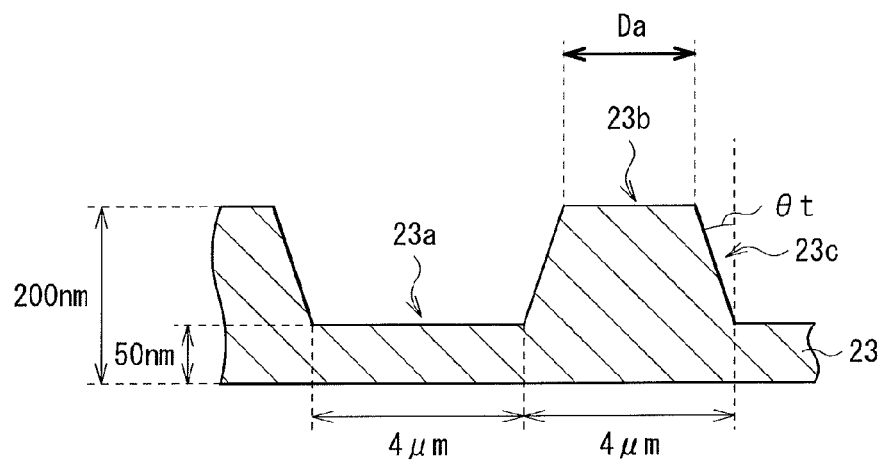
FIG. 38 is a cross-sectional view for explaining the scale of the concavo-convex structure according to a second example.
Figure 39:
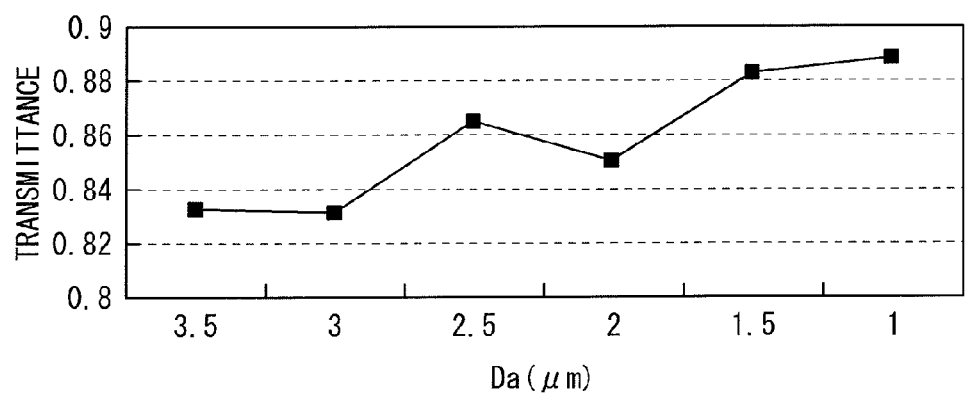
FIG. 39 is a characteristic view illustrating the relation between a width and the transmittance of a convex face according to the second example.

As a second example, the transmittance was measured in the case where a taper angle θt of the taper face 23c in the pixel electrode 23 described in Modification 3 was varied. Specifically, as illustrated in FIG. 38, the taper angle θt was varied under the conditions that the width S (4 µm) of the concave face 23a, the thickness Ta (50 nm), the pitch (=the width of the bottom of the trapezoid convex: 4 µm), and the thickness Tb (200 nm) of the convex face 23b were fixed, while the width Da of the convex face 23b was variable. At that time, the width D was varied by 0.5 µm in a range of 3.5 µm to 1 µm both inclusive. In any of the cases, the liquid crystal was aligned without issues, and the transmittance was high as illustrated in FIG. 39. Further, when the width Da was 1 µm, the transmittance was the highest.

Third example

Figure 40:
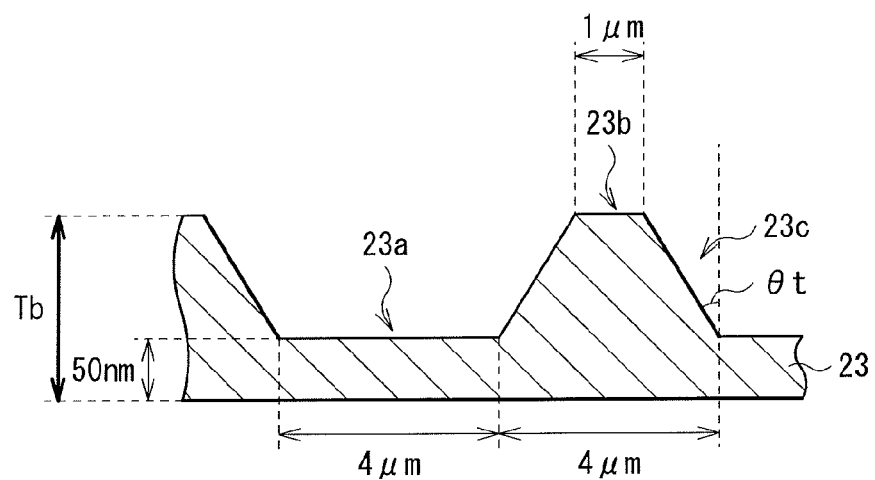
FIG. 40 is a cross-sectional view for explaining the scale of the concavo-convex structure according to a third example.
Figure 41:
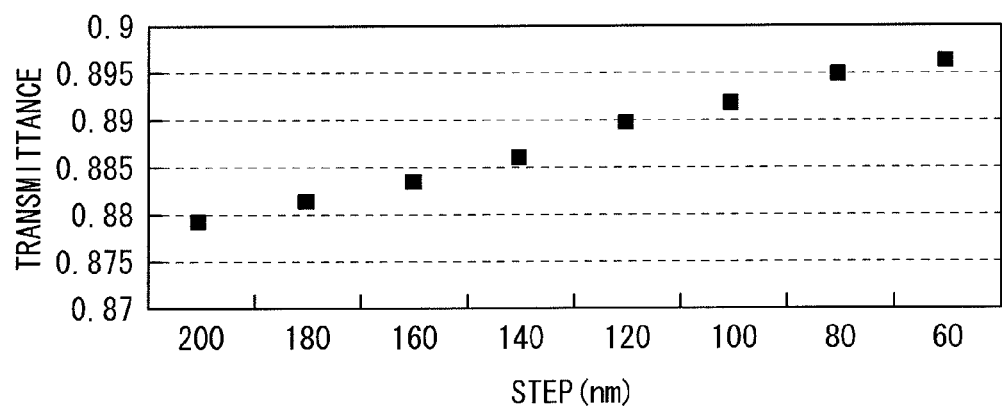
FIG. 41 is a characteristic view illustrating the relation between the step and the transmittance of the convex face according to the third example.

As a third example, the transmittance was measured in the case where the taper angle θt of the taper face 23c was varied in the same manner as the second example. However, in this example, as illustrated in FIG. 40, the step height (=Tb-50) was varied under the conditions that the width S (4 µm) of the concave face 23a, the thickness Ta (50 nm), the pitch (=the width of the bottom of the trapezoid convex: 4 µm) and the width (1 µm) of the convex face 23b were fixed, while the thickness Tb of the convex face 23b was variable. The step height was varied by 20 nm in a range of 200 nm to 60 nm both inclusive. In any of the cases, the liquid crystal was aligned uneventfully, and the transmittance was high as illustrated in FIG. 41. Further, the transmittance was high as the step height was smaller.

Hereinbefore, although the present invention has been described with the embodiment and the modifications, the present invention is not limited to the embodiment and the like, and various modifications may be made. For example, in the above-described embodiment and the like, although the description has been made with the example in which the concavo-convex structure is formed only on the surface of the pixel electrode, the concavo-convex structure may be formed on the surface of the opposite electrode. That is, the surface of the pixel electrode may be flat and the concavo-convex structure is provided on the surface of the opposite electrode, or the concavo-convex structure may be provided on the surfaces of both the pixel electrode and the opposite electrode.

In the above-described embodiment and the like, although the description has been made with the example in which the step portion of the concavo-convex structure has one of the vertical face, the taper face, or the reverse taper face, without being limited to this, the step portion of the concavo-convex structure may have a curved face. Further, although the description has been made with the example in which the cross-sectional shape of the concavo-convex structure with the step portion having the taper face is the trapezoid, the cross-sectional shape may be a triangle (that is, the shape without the top face).

Further, the thickness, the size, and the like of each layer in the liquid crystal display of the present invention are not limited to those described above. For example, although the description has been made with the example in which the width S of the concave face and the width L of the convex face are equal to each other (S=L=4 µm) in the pixel electrode, the width S of the slit and the width L of the electrode portion may be different from each other.

The present application contains subject matter related to that disclosed in Japanese Priority Patent Application JP 2010-087658 filed in the Japan Patent Office on Apr. 6, 2010, and Japanese Priority Patent Application JP 2011-038640 filed in the Japan Patent Office on Feb. 24, 2011, the entire contents of which is hereby incorporated by references.

It should be understood by those skilled in the art that various modifications, combinations, sub-combinations and alternations may occur depending on design requirements and other factors insofar as they are within the scope of the appended claims or the equivalents thereof.

What is claimed is:

1. A method of manufacturing a liquid crystal display, comprising the steps of:
   forming a plurality of pixel electrodes on a first substrate;
   forming an opposite electrode on a second substrate;

sealing a liquid crystal layer between the first and second substrates with the pixel electrode and the opposite electrode facing each other between the first substrate and the second substrate; and providing a pre-tilt to the liquid crystal layer by exposing the liquid crystal layer while applying a voltage across the liquid crystal layer through the pixel electrode and the opposite electrode, wherein, a face on a liquid crystal layer side of at least one pixel electrode includes concavo-convex structure, a face on the liquid crystal layer side of the opposite electrode includes concavo-convex structure, or each includes concavo-convex structure, and a step portion between a concave face and a convex face in the concavo-convex structure has a reverse taper face.

2. The method of manufacturing a liquid crystal display according to claim 1, wherein each pixel electrodes includes a concavo-convex structure, and the liquid crystal layer side face of the opposite electrode is flat.

3. The method of manufacturing a liquid crystal display according to claim 1, wherein a face of the at least one pixel electrode opposite from the liquid crystal layer side flat.

4. The method of manufacturing a liquid crystal display according to claim 2, wherein:

after a planarizing film is formed to cover a surface of the first substrate as a foundation layer for the plurality of pixel electrodes, the concavo-convex structure is formed on the surface of the planarizing film, and in the step of forming the plurality of pixel electrodes, each pixel electrode is formed on the planarizing film so that the liquid crystal layer side face of the pixel electrode has the concavo-convex structure following the concavo-convex structure of the planarizing film.

5. The method of claim 1, wherein the step of providing pre-tilt to the liquid crystal layer also comprises providing an alignment film on the first substrate, an alignment film on the second substrate or alignment films on the first and second substrates.

* * * * *